US005786091A

United States Patent [19]

Kurokawa et al.

[11] Patent Number: 5,786,091

[45] **Date of Patent: *Jul. 28, 1998**

[54] CHARGE ROLLER FOR AN IMAGE FORMING APPARATUS

[75] Inventors: Junji Kurokawa, Yokohama; Kazuo Nojima, Chiba; Masako Chiba, Urawa; Toshio Nakahara, Yokohama, all of Japan

[73] Assignee: Ricoh Company, Ltd., Tokyo, Japan

[ * ] Notice: The term of this patent shall not extend beyond the expiration date of Pat. No. 5,499,078.

[21] Appl. No.: 534,003

[22] Filed: Sep. 25, 1995

Related U.S. Application Data

[63] Continuation of Ser. No. 197,771, Jan. 12, 1994, abandoned, which is a continuation-in-part of Ser. No. 983,966, Dec. 1, 1992, abandoned.

[30] Foreign Application Priority Data

| | | | |
|---|---|---|---|
| Dec. 2, 1991 | [JP] | Japan | 3-343985 |
| Apr. 10, 1992 | [JP] | Japan | 4-91070 |
| Oct. 31, 1992 | [JP] | Japan | 4-316489 |
| Jan. 13, 1993 | [JP] | Japan | 5-003675 |
| Oct. 28, 1993 | [JP] | Japan | 5-270590 |

[51] Int. Cl.[6] .............................. B32B 25/08; G03G 15/02

[52] U.S. Cl. .......................... 428/421; 428/463; 428/378; 428/390; 428/332; 428/35.8; 399/176; 361/221; 361/225; 492/53; 492/56

[58] Field of Search .................................... 428/216, 214, 428/215, 421, 422, 447, 423.1, 423.9, 424.6, 425.8, 425.9, 463, 373, 378, 379, 390, 401, 35.8, 332; 355/259, 282, 285, 219; 399/176; 361/221, 225; 492/53, 56

[56] References Cited

U.S. PATENT DOCUMENTS

| | | | |
|---|---|---|---|
| 3,935,517 | 1/1976 | O'Brien . | |
| 4,522,866 | 6/1985 | Nishikawa | 428/216 |
| 4,727,453 | 2/1988 | Ewing . | |
| 4,922,299 | 5/1990 | Uchimoto et al. | 355/219 |
| 4,958,193 | 9/1990 | Nojima | 355/259 |
| 5,038,174 | 8/1991 | Kato et al. | 355/215 |
| 5,089,851 | 2/1992 | Tanaka et al. | 355/219 |
| 5,168,313 | 12/1992 | Hosaka et al. . | |
| 5,463,410 | 10/1995 | Uchiyama et al. . | |
| 5,499,078 | 3/1996 | Kurokawa et al. | 399/31 |

FOREIGN PATENT DOCUMENTS

| | | |
|---|---|---|
| 0 328 113 | 8/1989 | European Pat. Off. . |
| 0 367 203 | 5/1990 | European Pat. Off. . |
| 0 385 462 | 9/1990 | European Pat. Off. . |
| 0 406 834 | 1/1991 | European Pat. Off. . |
| 0 417 801 | 3/1991 | European Pat. Off. . |
| 0 510 643 | 10/1992 | European Pat. Off. . |
| 58-194061 | 11/1983 | Japan . |

OTHER PUBLICATIONS

Database WPI, Derwent Publications, vol. 17, No. 138 (P-1505), AN 92-418341, JP-A-4311942, Nov. 4, 1992.

McGraw-Hill Dictionary of Scientific and Technical Terms, 4th Ed., p. 1699, publication date not given.

*Encyclopedia of Polymer Science and Engineering*, vol. 6, pp. 308-315, "Epichlorohydrin Elastomers", John Wiley & Sons, Inc., 1986.

Bennet, Concise Chemical & Technical Dictionary, 4th Ed, Chem Publ., 1993.

*Primary Examiner*—Marie Yamnitzky

*Attorney, Agent, or Firm*—Oblon, Spivak, McClelland, Maier & Neustadt, P.C.

[57] ABSTRACT

In a charging device included in an image forming apparatus for charging an image carrier uniformly, a charge roller has an elastic layer and a surface layer. The elastic layer is made of a substance having a medium electric resistance and having no conductive particles dispersed therein. The surface layer is made of a non-adhering substance having a greater non-adhering property than the substance constituting the elastic layer.

6 Claims, 26 Drawing Sheets

IRREGULARITY PATTERN

OZONE ($O_3$) CONCENTRATIONS

| | I DC | II DC + AC |
|---|---|---|
| $I_{DC}$ <br> $I_{AG}$ | −20 μA <br> — | −15 μA <br> 1.0 mA |
| $O_3$ (ppm) | 0.01 | 0.34 ~0.40 |

Fig. 7

| ROLLER | SURFACE LAYER / ELASTIC LAYER | CHARGE CHARACTERISTIC Va = -1200V | IRREGULARITY OF CHARGE Vs | | UNIFORMITY OF CHARGE | | R & C OF ROLLER | |
|---|---|---|---|---|---|---|---|---|
| | | | DC | DC+AC | DC | DC+AC | R | C |
| a | SINGLE EPICHLOROHYDRIN RUBBER LAYER | -600 V | 70V | 50V | △ | △ | $10^8$ Ω·cm | 50PF |
| b | FLUORIC RESIN / HYDRIN RUBBER | -410 V | 100V | 40V | × | △ | $10^{13}$ Ω·cm | 120PF |
| c | FLUORINE HYDRIN / HYDRIN RUBBER | -560 V | 10V | 10V | ○ | △ | $10^9$ Ω·cm | 70PF |

INVENTION

INVENTION

| | UNIFORMITY OF CHARGE | CHARGEABILITY |
|---|---|---|
| 0.8 mm | × | ○ |
| 1.0 | △ | ○ |
| 3.0 | ○ | ○ |
| 5.0 | ○ | △ |
| 5.2 | ○ | × |

CHARGEABILITY → CHARGE POTENTIAL OF DRUM AGAINST GIVEN APPLIED VOLTAGE FOR APPLIED VOLTAGE OF -1.4KV

○: -750 ~ -800V
△: -740V
×: -650V

UNIFORMITY OF CHARGE:
○: UNIFORM
△: MEDIUM
×: IRREGULAR

OZONE CONCENTRATION

| | |
|---|---|
| ROLLER CHARGE DC | 0.01 ppm |
| ROLLER CHARGE DCTAC ( AC Vp-p > 2VTH ) | 0.30~0.40 ppm |
| CORONA CHARGE (NEGATIVE CORONA SCROTRON ) | 8 ~ 10 ppm |

| URETHAN RUBBER | PERCHLORIC ACID LITHIUM | ELECTRIC RESISTANCE |
|---|---|---|
| 100 PARTS | — | $3 \times 10^9$ Ω · cm |
| 100 PARTS | 0.15 PARTS | $3 \times 10^8$ Ω · cm |
| 100 PARTS | 0.1 PARTS | $5 \times 10^7$ Ω · cm |
| 100 PARTS | 0.2 PARTS | $4 \times 10^6$ Ω · cm |

CHARGE ROLLER FOR AN IMAGE FORMING APPARATUS

CROSS REFERENCE TO RELATED APPLICATION

This application is a Continuation of application Ser. No. 08/197,771, filed Jan. 12, 1994, now abandoned, which is a Continuation-in-Part of application Ser. No. 07/983,966, filed on Dec. 1, 1992, now abandoned.

BACKGROUND OF THE INVENTION

The present invention relates to a copier, printer, facsimile transceiver or similar electrophotographic image forming apparatus and, more particularly, to a charge roller for uniformly charging the surface of a photoconductive element, or image carrier, during a sequence of image forming steps.

It has been customary with an image forming apparatus of the type described to use a corona discharger as charging means for uniformly charging the surface of a photoconductive element. A corona discharger effectively charges the surface of a photoconductive element uniformly to a predetermined potential. However, the problem is that a corona discharger needs a high tension power source and generates ozone during discharge. Ozone generated in a great amount would not only pollute the environment but also aggravate the deterioration of a charging member as well as the photoconductive element.

In light of this, there has been proposed a charging device using a charge roller in place of the corona discharger. This type of charging device has a charge roller held in contact with and driven by a photoconductive drum. The charge roller has a metallic core. As a voltage is applied from a power source to the core of the charge roller, the roller charges the surface of the drum. With the charge roller, it is possible to lower the required voltage of the power source and to reduce the amount of ozone ascribable to charging. In addition, the charge roller prevents dust particles from electrostatically depositing on a corona wire and eliminates the need for a high tension power source. However, the problem with this type of charger is that the charge distribution is apt to become irregular and, in addition, the charge potential is extremely susceptible to the environment. In fact, such a charger is far inferior to a charger of the type using a corona discharger in respect of the uniformity of charge distribution.

Actually, we found smears in the background of images produced in the early mornings of winter by a laser printer with a charge roller. This is presumably because the charge roller left at low temperature during the nighttime has the electric resistance thereof increased and, therefore, the charge potential of the photoconductive drum is lowered by about 200 V, compared to a normal temperature and humidity range, to thereby cause reversal development to occur.

Japanese Patent Laid-Open Publication No. 149668/1988 (referred to as Document 1 hereinafter) teaches that the uniformity of charge is noticeably improved when an AC voltage having a peak-to-peak voltage more than twice as high as a charge start voltage ($V_{TH}$) is superposed in the event of application of a DC voltage. Japanese Patent Laid-Open Publication No. 132356/1981 (referred to as Document 2 hereinafter) discloses an implementation wherein a voltage is applied from a constant current power source to a charge roller in order to reduce the susceptibility of the charge roller to ambient conditions. Japanese Patent Laid-Open Publication No. 156476/1990 (referred to as Document 3 hereinafter) proposes an arrangement wherein an AC-superposed DC voltage is applied to a charge roller to insure stable charging with no regard to the environment. Further, Japanese patent Laid-Open publication No. 288174/1990 (referred to as Document 4 hereinafter) teaches means for heating a charge roller for the purpose of eliminating the dependency of the roller on the environment.

However, the scheme of Document 1 needs an AC power source in addition to a DC power source for superposing the AC voltage on the DC voltage, increasing the cost of the apparatus. Moreover, a great amount of AC current not contributing to the charge potential of the photoconductive element is wastefully consumed. This not only increases the running cost of the apparatus but also generates a great amount of ozone, bringing about the previously stated critical problems. With Document 2, it may be expected that due to the constant current power source the current and, therefore, the charge potential of the photoconductive element remains constant with no regard to the electric resistance of the charge roller. In practice, however, changes in leak current ascribable to the varying ambient conditions, particularly humidity, are not negligible. As a result, the current contributing to the charging of the photoconductive element changes to make the charge irregular in particular portions of the charged surface of the element. The approach of Document 3 increases the cost due to the AC power source although it reduces irregular charging. Further, the implementation of Document 4 increases the scale and cost of the apparatus since the heating means heats the entire charge roller.

SUMMARY OF THE INVENTION

It is, therefore, an object of the present invention to provide a charge roller for an image forming apparatus which is capable of reducing the cost of the apparatus itself, power source cost, and generation of ozone to thereby prevent a charging member and a photoconductive element from deteriorating, and avoiding environmental pollution.

It is another object of the present invention to provide a charge roller for an image forming apparatus which, with a simple construction, insures attractive images at all times without regard to the varying environment.

A charge roller for charging a photoconductive element included in an image forming apparatus of the present invention comprises an elastic layer made of a substance having a medium electric resistance and having no conductive particles dispersed therein, and a surface layer made of a non-adhering substance having a greater non-adhering property than the substance having a medium electric resistance.

BRIEF DESCRIPTION OF THE DRAWINGS

The above and other objects, features and advantages of the present invention will become more apparent from the following detailed description taken with the accompanying drawings in which:

FIG. 7 tabulates the characteristics of three kinds of rollers fabricated for a test;

DESCRIPTION OF THE PREFERRED EMBODIMENTS

To better understand the present invention, a reference will be made to some conventional charging devices of the type using a charge roller, shown in FIGS. 34–36.

Figure 34:
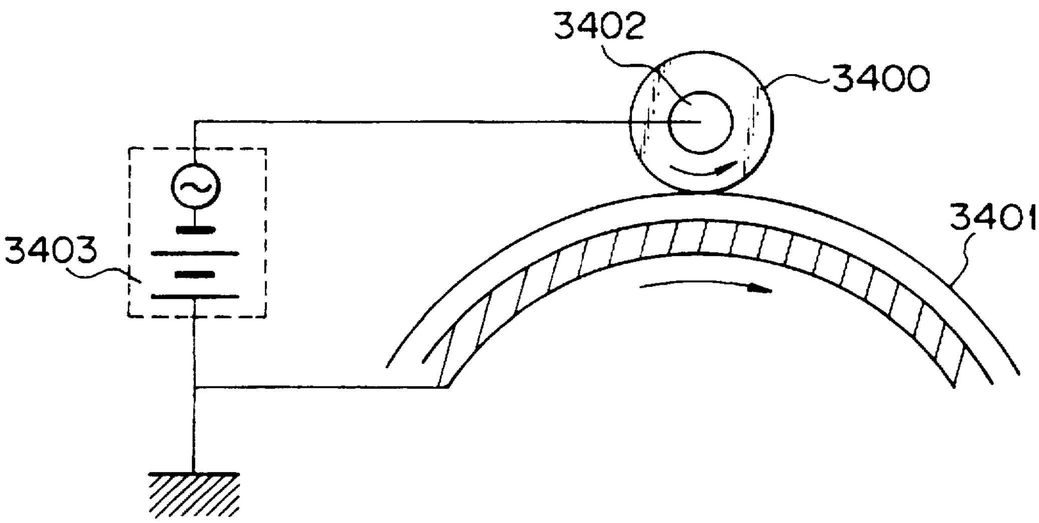
Fig. 34 PRIOR ART
FIG. 34 shows how a conventional charge roller is used.

A charging device shown in FIG. 34 has a charge roller 3400 held in contact with and driven by a photoconductive drum 3401. The charge roller 3400 has a metallic core 3402. As a voltage is applied from a power source 3403 to the core 3402 of the charge roller 3400, the roller 3400 charges the surface of the drum 3401. With the charge roller 3400, it is possible to lower the required voltage of the power source 3403 and to reduce the amount of ozone ascribable to charging. In addition, the charge roller 3400 prevents dust particles from electrostatically depositing on a corona wire and eliminates the need for a high tension power source. However, the problem with this type of charger is that the charge distribution is apt to become irregular and, in addition, the charge potential is extremely susceptible to ambient conditions. In fact, such a charger is far inferior to a charger of the type using a corona discharger in respect to the uniformity of charge distribution.

Figure 35:
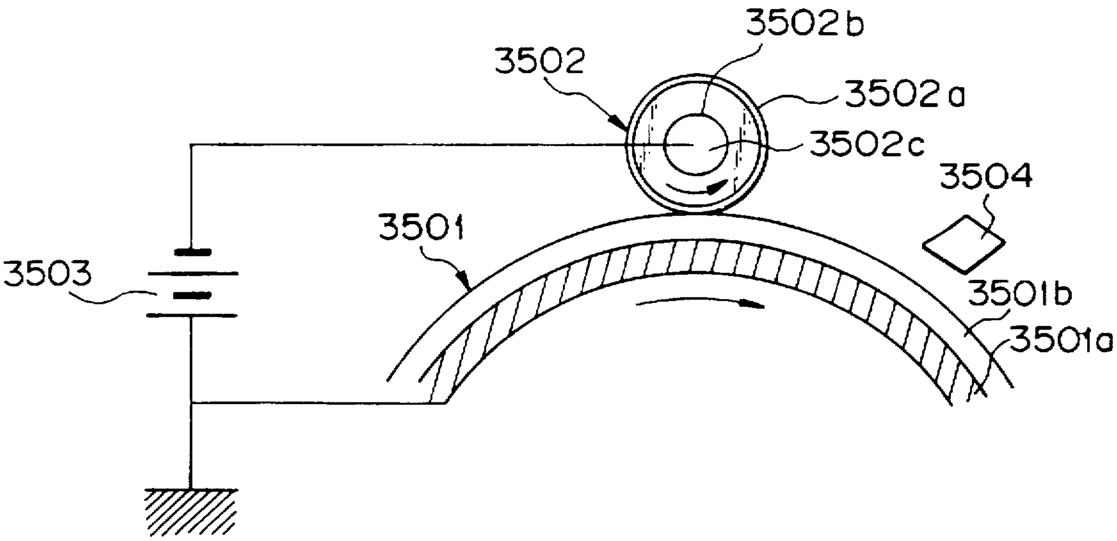
Fig. 35 PRIOR ART
FIG. 35 is a section showing a conventional charging device incorporated in an image forming apparatus.
Figure 36:
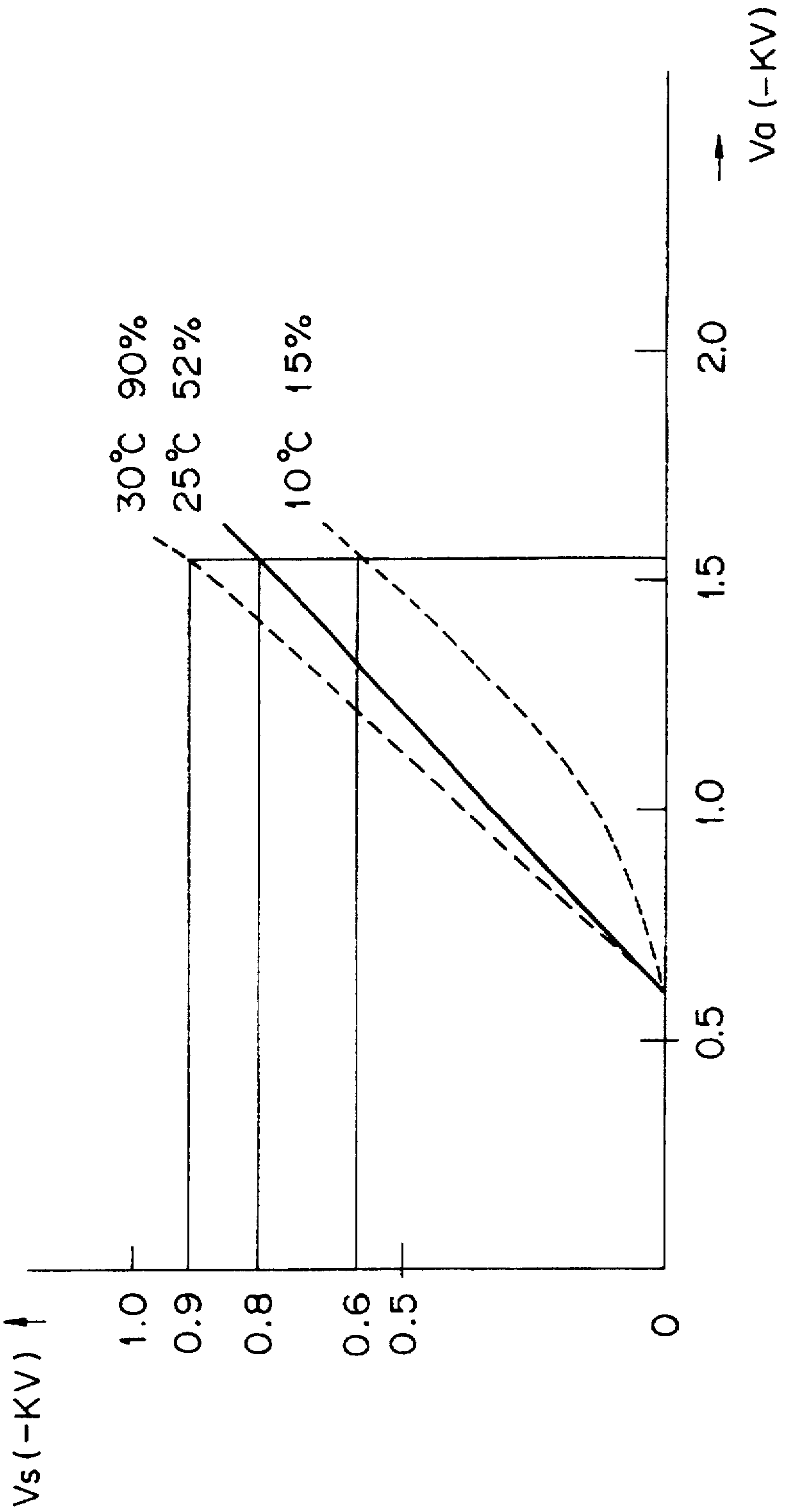
Fig. 36 PRIOR ART
FIG. 36 indicates a relation between a voltage applied to a charge roller and a charge potential of a photoconductive drum heretofore observed under various conditions.

FIG. 35 shows another conventional charging device using a charge roller. As shown, a photoconductive drum 3501 is made up of a metallic drum 3501*a* and a photoconductive layer 3501*b* covering the surface of the drum 3501. A charge roller 3502 is constituted by a metallic core 3502*c*, a conductive rubber layer 3502*b*, and a resistance layer 3502*a* forming the surface of the roller 3502. As the drum 3501 is rotated clockwise as viewed in the figure, the charge roller 3502 is rotated counterclockwise by the drum 3501. A DC power source 3503 is connected between the drum 3501 and the charge roller 3502. An electrometer 3504 is located in close proximity to the drum 3501 to measure the charge potential thereof. Assume three different kinds of environments, e.g., a high temperature and high humidity environment wherein the temperature is 30 degrees centigrade and the humidity is 90 percent, a normal temperature and normal humidity environment wherein the temperature is 25 degrees centigrade and the humidity is 52 percent, and a low temperature and low humidity environment wherein the temperature is 10 degrees centigrade and the humidity is 15 percent. Then, in each of such environments, a voltage Va (−kV) applied and a charge potential Vs (−kV) are related with each other, as shown in FIG. 36. When the high tension power source 4503 is implemented by a constant DC power source and so set as to set up a charge voltage Vs of −800 V, the voltage Va is substantially −1.5 kV, as FIG. 36 indicates. As the environment changes to the high temperature and high humidity environment, the charge potential Vs changes to substantially −900 V; as the former changes to the low temperature low humidity environment, the latter changes to substantially −600 V. In this manner, the charge potential changes over a range of 300 V in total, giving rise to various problems in practical use.

Although some implementations have been proposed to eliminate the above problems, none of them is fully satisfactory, as discussed earlier.

The present invention will be described specifically hereinafter.

Figure 1:
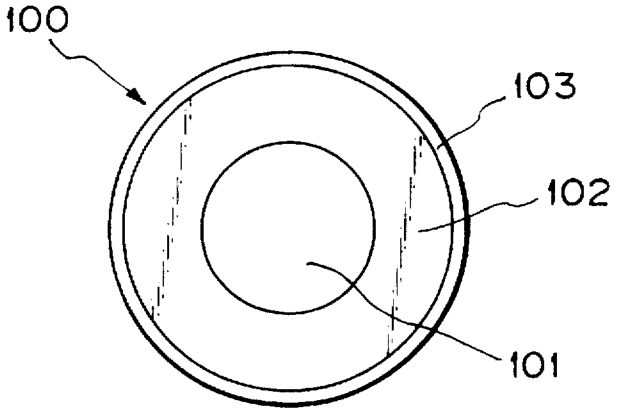
FIG. 1 BACKGROUND ART
FIG. 1 is a section showing an ordinary charge roller.

FIG. 1 shows the structure of an ordinary charge roller 100. The charge roller 100 has a 8 ϕ metallic core 101, an about 4 mm thick conductive elastic layer 102 covering the core 101 and constituted by carbon-dispersed silicone rubber ($10^3$ Ω.cm), and a 50 μm thick surface layer 103 covering the elastic layer 102 and made of nylon ($10^{12}$ Ω.cm).

Figure 2:
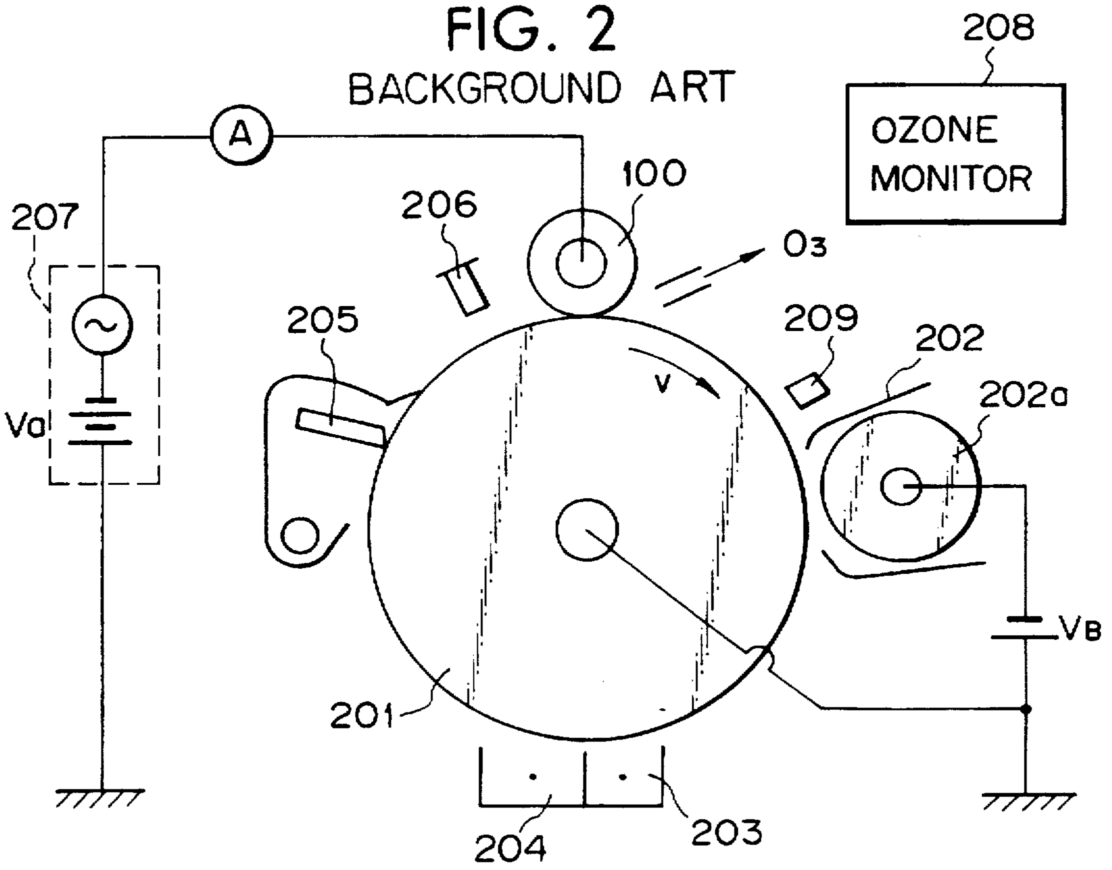
FIG. 2 BACKGROUND ART
FIG. 2 is a section showing a specific testing device based on an electrophotographic process and used to determine the characteristic of a charge roller.

FIG. 2 shows an image forming apparatus used to test the charge roller of FIG. 1 with respect to the charging characteristic and the uniformity of charge distribution. As shown, the apparatus has a photoconductive drum 201 and the charger roller 100 held in contact with the drum 201. A developing section 202 develops an electrostatic latent image formed on the drum 201 whose surface has been charged by the charge roller 100 with a toner. A transfer charger 203 transfers the resulting toner image from the drum 201 to a paper or similar recording medium fed from a transport line (not shown). A separation charger 204 discharges, after the image transfer, the paper so as to separate it from the drum 201. A cleaning blade 205 removes the toner remaining on the drum 201 after the image transfer. A discharge lamp 206 dissipates the charge also remaining on the drum 201 after the image transfer. A power source 207 applies a voltage to the discharge roller 100. The developing section 202 has a developing sleeve **202*a* for transporting the toner to the drum 201. A bias voltage is applied to the developing sleeve 202*a* for adjusting the amount of toner to deposit on the drum 201. There are also shown in the figure an ozone monitor 208 for monitoring ozone ascribable to the operation of the charge roller 100, and an electrometer 209 facing the center of the drum 201 at a position immediately preceding the developing section 202**.

In operation, the drum 201 is rotated at a linear velocity v mm/sec by a drive line (not shown). The charge roller 100 charges the surface of the drum 201 to negative polarity in response to a voltage from the power source 207. As the charged surface of the drum 201 is exposed to imagewise light, the charge on the drum 201 is selectively erased (dissipated) on the basis of the intensity of light. As a result, a latent image is electrostatically formed on the drum 201. The developing section 202 develops the latent image by reversal development to convert it to a toner image. The transfer charger 203 transfers the toner image from the drum 201 to a paper fed from the transport line. The separation charger 204 separates the paper with the toner image from the drum 201. The toner and the charge remaining on the drum 201 after the image transfer are removed by the cleaning blade 205 and the discharge lamp, respectively. This is the end of one image forming cycle.

Figure 3:
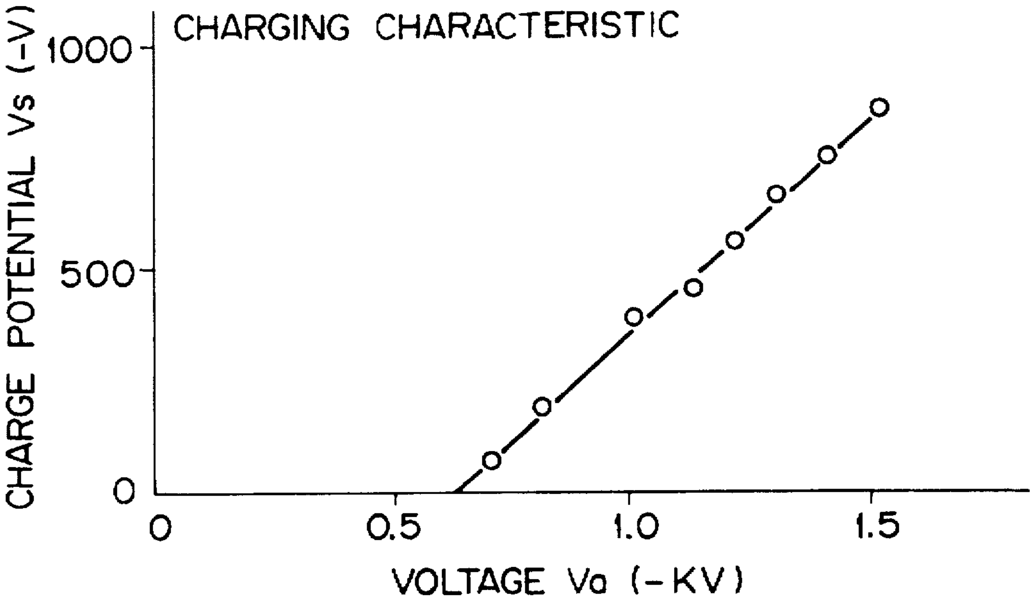
FIG. 3 is a graph showing a relation between a DC voltage applied to a charge roller and a charge potential of a photoconductive drum.
Figure 4:
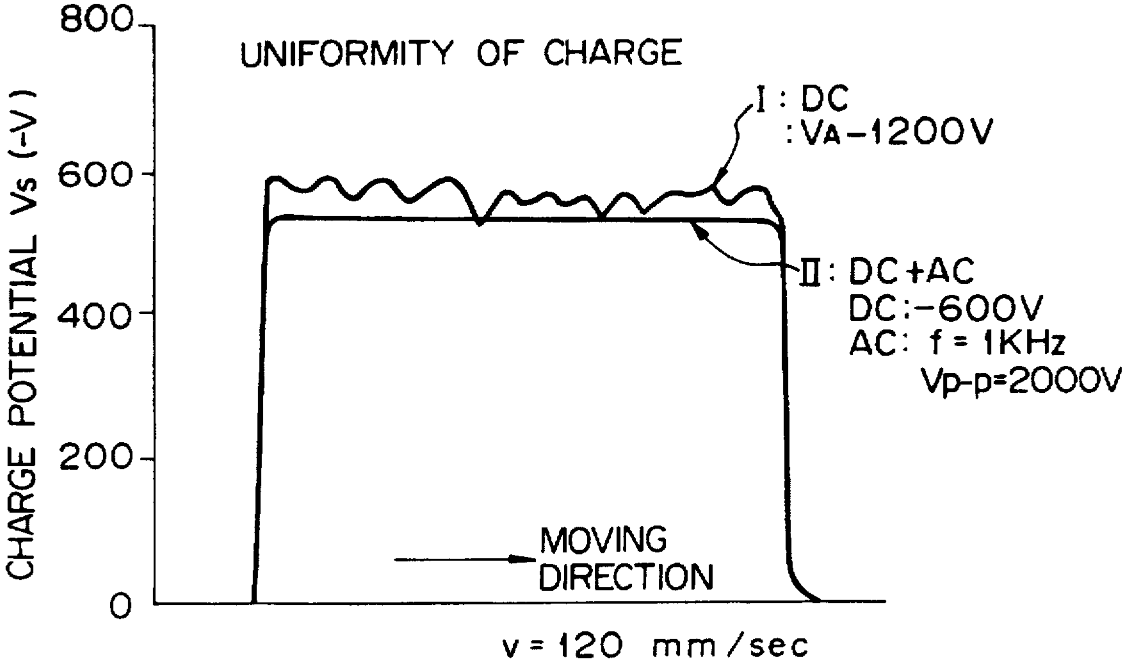
FIG. 4 plots irregularities in the charge potential as measured in the moving direction of the drum.

FIGS. 3 and 4 show respectively the charge characteristic and the uniformity of charge distribution determined by the electrometer 209. Specifically, FIG. 3 shows a relation between the DC voltage Va (−kV) applied to the charge roller 100 and the charge potential Vs (−V) deposited on the drum 201. FIG. 4 indicates irregularities in the charge potential Vs on the drum 201 measured by the electrometer 209 in the moving direction of the drum 201. As shown, I: DC (−1200 V) and II: DC+AC (DC: −600 V and AC: Vp−p=2.0 kV/f=1.0 kHz) are applied to the charge roller 100. While the range of irregularity in charge potential Vs is $|Vs_{(MAX)}-VS_{(MIN)}|$=80 V in the above condition I, it is about 10 V in the condition II.

Figures 5, 6:
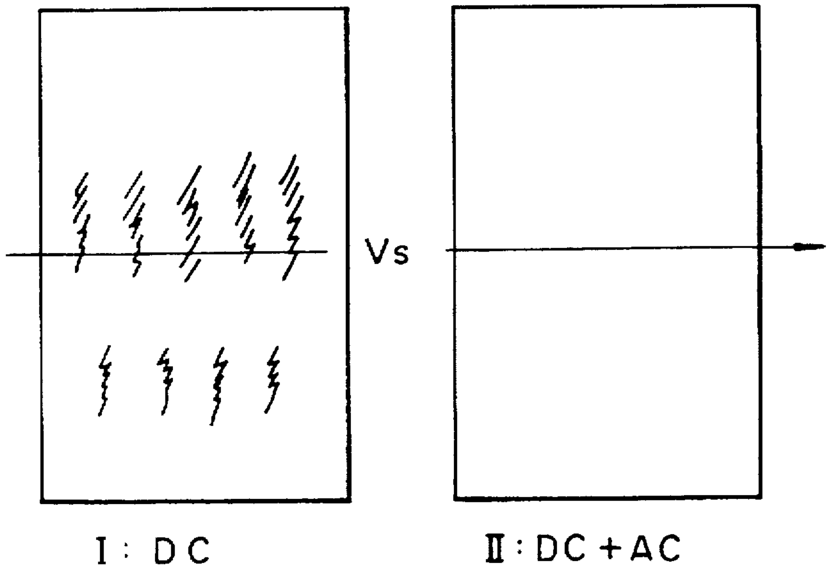
FIG. 5 shows a specific charge irregularity pattern.
FIG. 6 is a graph for comparing ozone concentrations.

Further, assume that reversal development is effected with a bias voltage $V_B$ for development (−550 V, −600 V, −650 V) in association with the charge potential Vs (about −600 V). Then, as shown in FIG. 5, the toner deposits in portions where the charge potential Vs is lower than the bias $V_B$, i.e., the charge distribution is irregular over the entire charged area. As a result, in the above condition I, the background is contaminated at the period of the charge roller 100. This is determined to be the irregularity in charge distribution ascribable to the non-uniform electric characteristic of the roller layer. By contrast, in the condition II, the toner is slightly deposited over the entire area, i.e., the irregularity in charge distribution is unnoticeable.

FIG. 6 lists ozone ($O_3$) concentrations (ppm) determined under the conditions I and II and with the inlet of the ozone monitor 208 located at the outlet side of the portion where the charge roller 100 and drum 201 contact. As FIG. 6 indicates, the AC current aggravates the generation of ozone. It follows that if only the DC voltage is applied to the charge roller 100, i.e., if the AC voltage is not superposed on the DC voltage, ozone can be reduced.

Further studies on the irregularity in charge to occur when the DC voltage is applied to the charge roller 100 have showed that it is ascribable to the fact that the conductive elastic layer 102 is implemented by a carbon and silicone rubber dispersion. This was found when use was made of a charge roller (nylon/epichlorohydrin rubber) whose conductive elastic layer 102 was made of epichlorohydrin rubber. Specifically, the irregularity results from the non-uniform electric characteristic of the layer 102 which in turn results from the incomplete dispersion of carbon and silicone rubber. The irregularity is eliminated when such a dispersion is replaced with epichlorohydrin rubber which is not dispersible.

The nylon surface layer 103 of the charge roller 100 is extremely susceptible to environment. To improve this point, as shown in FIG. 7, we prepared charge rollers 100 (*a*), (*b*) and (*c*) each being made of a particular substance and evaluated them with respect to the charging characteristic and the uniformity of charge. As FIG. 7 indicates, to achieve a uniform charge distribution with only the DC voltage, the elastic layer (2 mm to 20 mm thick) of the charge roller 100 should be electrically uniform. In this respect, although a single layer (roller (a), FIG. 7) of undispersible and low resistance rubber (epichlorohydrin rubber) is optimum, the surface configuration attainable therewith is not desirable and degrades the uniformity of charge distribution. To improve the surface configuration, the roller (b) shown in FIG. 7 is provided with a 30 μm thick surface layer of resin. This, however, degrades the charging characteristic and the uniformity of charge since the surface layer of fluoric resin has a high resistance. To improve the surface configuration without effecting the charging characteristic, a 10 μm to 100 μm thick surface layer may be formed of a low resistance rubber and resin dispersion which also implements the elastic layer. The roller (c) shown in FIG. 7 has such a surface layer. More preferably, the resin concentration of the surface layer should be sequentially increased toward the surface while the rubber concentration should be sequentially increased toward the elastic layer. This kind of surface layer can be formed if solutions each having a particular mixture ratio of resin and rubber are applied one after another. For the elastic layer, use may be made of epichlorohydrin rubber, nitrile rubber, urethane rubber, acryl rubber or chloropretane rubber. Regarding the surface layer, fluoric resin, silicone resin or similar resin is most desirable.

As stated above, the charge roller of the invention configured to achieve a uniform charge distribution by a DC voltage only and the conventional charge roller relying on an AC voltage to achieve the same object are noticeably different in the charging characteristic (R, C) and the structure of the layers. Specifically, in the conventional charge roller has a conductive elastic layer (carbon-dispersed rubber) and surface (resistance) layer. In this type of roller, since the surface layer plays the role of a capacitor, the electrostatic capacitance C is great and contributes a great deal to a uniform charge distribution. By contrast, since the charge roller of the invention plays the role of a resistor (the electrostatic capacity C is small), the uniformity of charge will not be noticeably improved even if AC is superposed on DC.

Preferred embodiments of the present invention will be described in detail hereinafter.

[1st Embodiment]

Figure 8A:
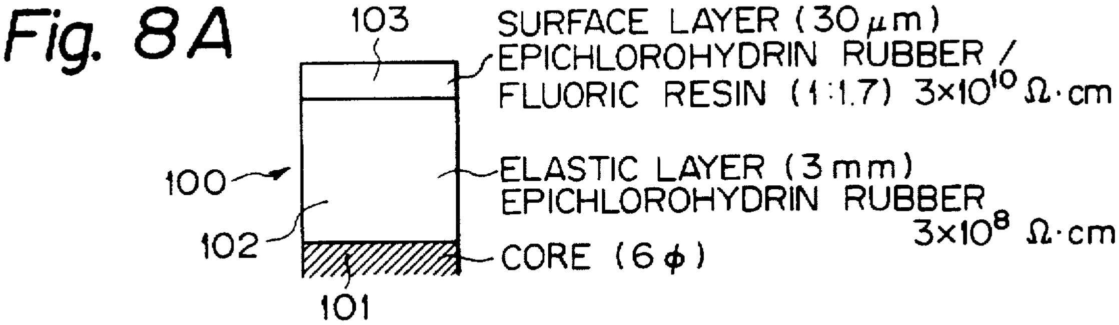
FIGS. 8A–8E are sections each showing a preferred embodiment of the present invention.

As shown in FIG. 8A, in a first embodiment, the elastic layer 102 of the charge roller 100 is molded by applying epichlorohydrin rubber to the 6 ϕ core such that the roller outside diameter is 12 ϕ. The surface layer 102 has an electric resistance of $3\times10^8$ Ω.cm. 100 parts of solution of epichlorohydrin rubber (2.5 wt % of solid) and 40 parts of solution of fluoric resin soluble to a solvent (10.8 wt % of solid) are applied to the elastic layer 102 such that a 30 μm thick film or surface layer 103 is formed when dried. The surface layer 103 has an electric resistance of $3\times10^{10}$ Ω.cm.

The charge roller 100 has a charging characteristic of Vs=−580 V against Va (DC) of −1200 V, confines the irregularity in charge potential Vs in a range of 12 V, and sets up a uniform charge distribution.

[2nd Embodiment]

Figure 8B:
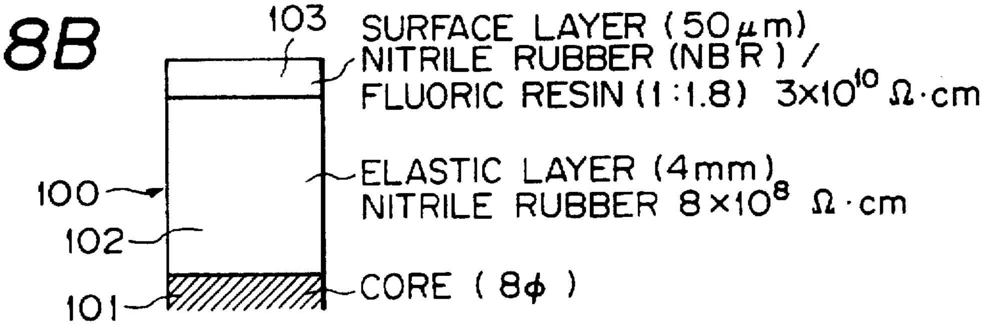

As shown in FIG. 8B, nitrile rubber (NBR) is molded on the 8 ϕ core 101 such that the roller outside diameter is 16 ϕ, whereby the elastic layer 102 is formed. The elastic layer 102 has an electric resistance of $8\times10^8$ Ω.cm. 100 parts of solution of nitrile rubber (2.5 wt % of solid) and 40 parts of solution of fluoric resin soluble to a solvent (10.8 wt % of solid) are applied to the elastic layer 102 such that a 50 μm thick film or surface layer 103 is formed when dried. The surface layer 103 has an electric resistance of $8\times10^{10}$ Ω.cm. The charge roller 100 has a charging characteristic Vs=−570 V against Va (DC) of −1200 V, confines the irregularity in charge potential Vs in a range of 15 V, and sets up a charge distribution as uniform as that of the first embodiment.

[3rd Embodiment]

Figure 8C:
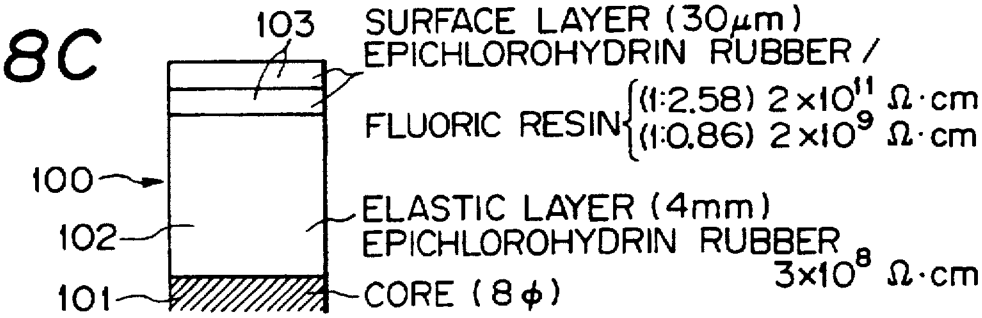

As shown in FIG. 8C, epichlorohydrin rubber is molded on the 8 ϕ core 101 such that the roller outside diameter is 16 ϕ, whereby the elastic layer 102 is formed. A solution of epichhlorohydrin rubber (2.5 wt % of solid) and a solution of fluoric resin soluble to a solvent (10.8 wt % of solid) are mixed and applied to the elastic layer 102 twice while having the mixture ratio thereof changed, such that two films each being 30 μm thick are formed when dried. Specifically, a mixture of 100 parts of epichlorohydrin rubber solution and 20 parts of fluoric resin solution (electric resistance of $2\times10^8$ Ω.cm) is applied first, and then a mixture of 100 parts of epichlorohydrin rubber solution and 60 parts of fluoric resin solution (electric resistance of $2\times10^{11}$ Ω.cm) is applied. The charge roller 100 has a smooth surface due to the great concentration of fluoric resin, has a charging characteristic Vs −580 V against Va (DC) of −1200 V, confines the irregularity in charge potential Vs in a range of 100 V, and achieves a uniform charge distribution.

[4th Embodiment]

Figure 8D:
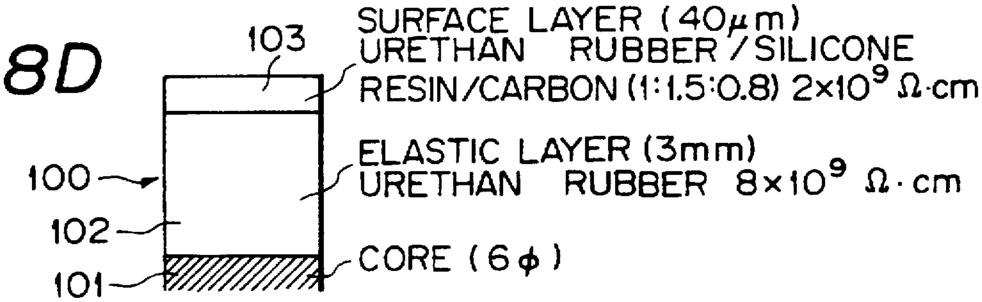

As shown in FIG. 8D, urethane rubber is molded on the 6 ϕ metal core 101 such that the roller outside diameter is 12 ϕ, whereby the elastic layer 102 is formed. The elastic layer 102 has an electric resistance of $8\times10^9$ Ω.cm. 100 parts of solution of urethane rubber (2.5 wt % of solid), 50 parts of solution of silicone resin soluble to a solvent (7.5 wt % of solid), and 2 parts of carbon are applied to the elastic layer 102 such that a 40 μm thick film or surface layer 103 is formed when dried. The surface layer 103 has an electric resistance of $2\times10^9$ Ω.cm. The charge roller has a charging characteristic Vs of −560 V against Va (DC) of 1200 V, confines the irregularity in charge potential Vs in a range of 18 V, and achieves a uniform charge distribution.

[5th Embodiment]

Figure 8E:
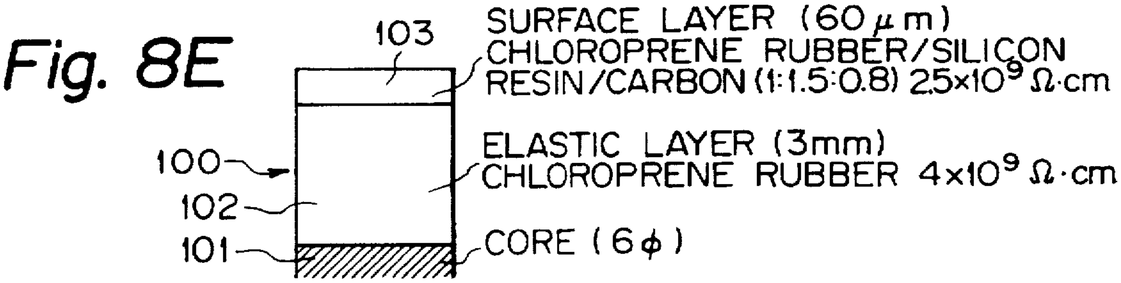

As shown in FIG. 8E, this embodiment is identical with the fourth embodiment except that urethane rubber of the fourth embodiment is replaced with chloropyrene rubber, and that the surface layer 103 is 60 μm thick. The charge roller 100 has a charging characteristic of Vs=−590 V against Va (DC) of −1200 V, confines the irregularity in charge potential Vs in a range of 15 V, and achieves a uniform charge distribution.

As stated above, the present invention provides the charge roller with a smooth surface without degrading the charging characteristic since the surface layer is implemented by a mixture of polar synthetic rubber and non-adhesive resin. Since the resin concentration sequentially increases toward the surface of the surface layer, the surface configuration is desirable and the durability of the roller is increased. Furthermore, since the synthetic resin (undispersible) has an electric resistance of $10^6$ Ω.cm to $10^{10}$ Ω.cm and is not dispersible, electric breakdown does not occur even when the surface layer contacts the pin holes of a photoconductor.

[6th Embodiment]

Figure 9:
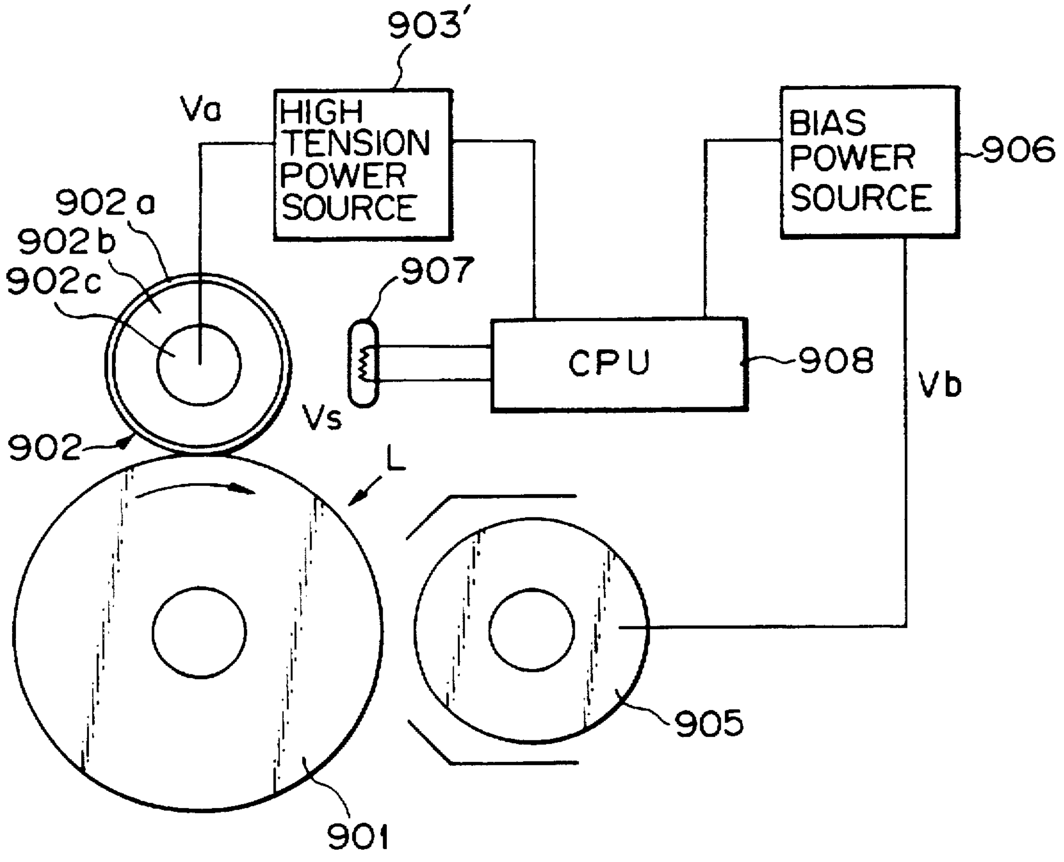
FIG. 9 shows an image forming apparatus in accordance with the present invention.

FIG. 9 shows a laser printer or similar image forming apparatus to which a sixth embodiment of the invention is applied. As shown, the apparatus has a photoconductive drum 901 having a diameter of, for example 60 mm, and a charge roller 902 having a diameter of 15 mm and rotatably contacting the drum 901. A high tension power source 903' is connected to the charge roller 902. The charge roller 902 is made up of a metallic core **902*c* having a diameter of, for example, 10 mm, a 5 mm thick conductive rubber layer 902*b*, and a 50 μm thick surface resistance layer 902*a*. A developing unit 905 for effecting reversal development deposits a dry toner on a latent image electrostatically formed on the drum 901 by a laser beam L. A bias voltage Vb is applied from a bias power source 906 to the developing unit 905. At least one of the bias power source 906 and the high tension power source 903' is controlled by a thermistor 907 responsive to the temperature around the charge roller 902 via a CPU (Central Processing Unit) 908**.

Experiments showed that a desirable image is achievable when the surface of the drum 901 is moved at a linear velocity v of 120 mm/sec, the temperature T around the charge roller 902 as measured by the thermistor 907 is 25 degrees centigrade, the voltage Va applied to the charge roller 902 is −1.54 kV, the charge voltage Vs to the drum 901 is −800 V, and the bias voltage for development Vb is −600 V.

Figure 10A:
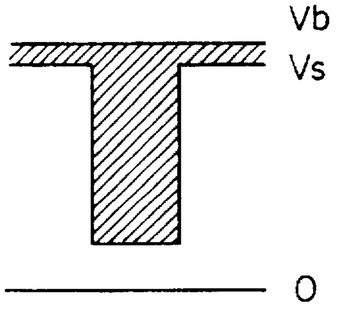
Fig. 10A PRIOR ART
FIGS. 10A–10C demonstrates an improvement which the present invention constitutes over the prior art.
Figure 10B:
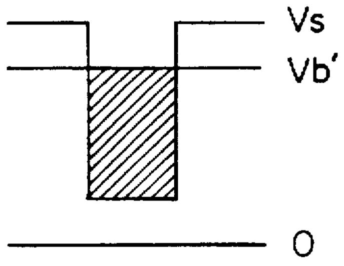
Figure 10C:
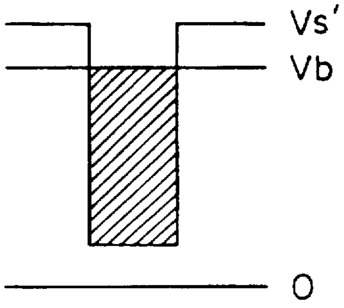

In an environment of, for example, T=10 degrees centigrade corresponding to the early mornings of winter and under the conventional condition wherein none of the power sources 903' and 906 is controlled by the CPU 908, Vs was measured to be 590 V and smeared the background, as shown in FIG. 10A. Assume that T=10 degrees centigrade is sensed by the thermistor and applied to the CPU 908. Then, when the bias voltage V'b was controlled to −500 V, as shown in FIG. 10B, or when the voltage V'a to the charge roller 902 was controlled to −1.6 kV (V's=−650 V), as shown in FIG. 10C, an attractive image free from smears in the background thereof was produced.

Figure 11:
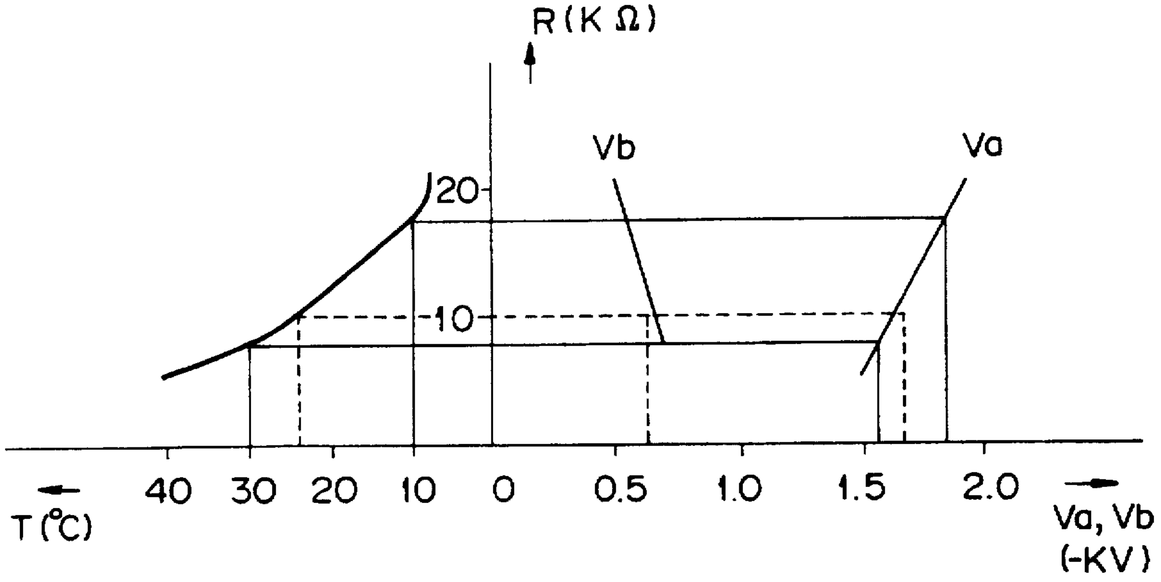
FIG. 11 plots a relation of the surface temperature of a charge roller, the resistance of a thermistor, and the output of a power source.

FIG. 11 plots a T-R-Vb characteristic and a T-R-Va characteristic representative of a relation of the surface temperature T of the charge roller 902, the resistance R of the thermistor 907 and the DC power source outputs Vb and Va which holds when the thermistor 907 and the charge roller are built in a DC power source circuit for the bias Vb and a DC power source circuit for the roller voltage Va, respectively.

[7th Embodiment]

Figure 12:
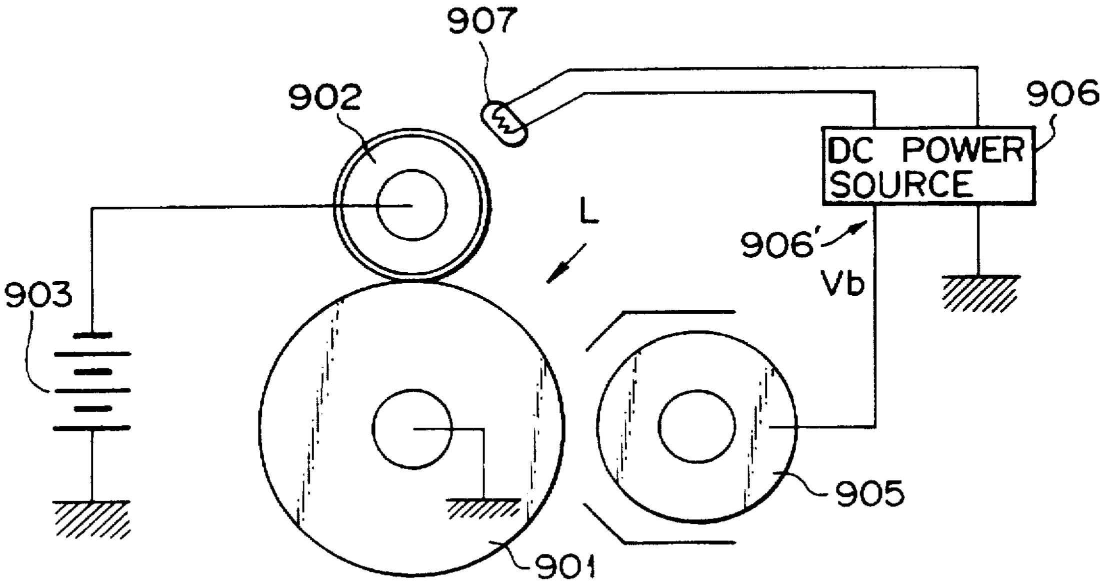
FIGS. 12, 13 and 14 are sections each showing another image forming apparatus in accordance with the present invention.

FIG. 12 shows a seventh embodiment wherein the bias voltage Vb to the developing unit 905, FIG. 9, is controlled in conformity to the T-R-Vb characteristic of FIG. 11. As shown, the thermistor 907 adjoining the charge roller 902 is built in a bias DC power source 906' so as to apply an optimum bias voltage Vb with no regard to the environment. This is successful in insuring a desirable image free from background contamination. It was found that an attractive image is produced when T=16 degrees centigrade, R=14 kΩ, and Vb=−560 V, and Vs in such a condition is −740 V.

[8th Embodiment]

Figure 13:
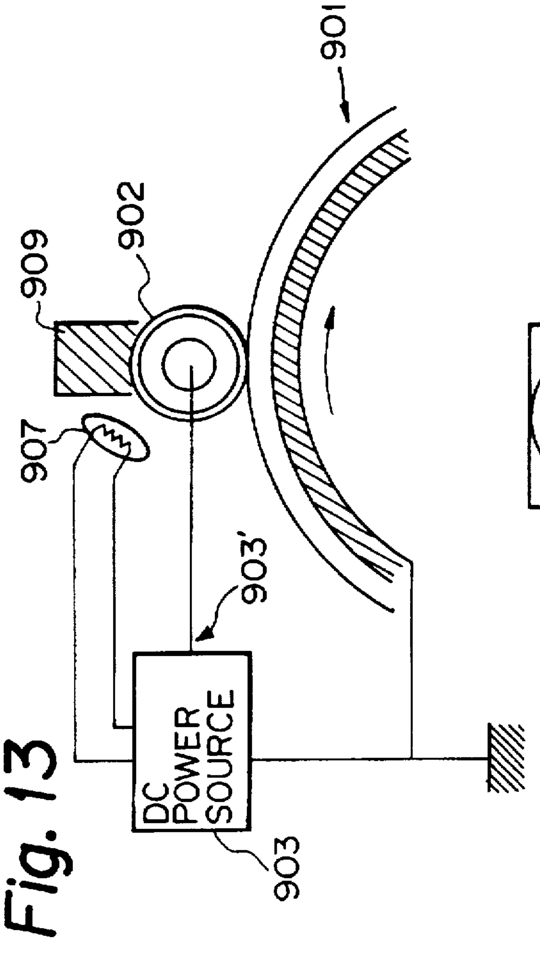

FIG. 13 shows an eighth embodiment wherein the voltage Va to the charge roller 902, FIG. 9, is controlled on the basis of the T-R-Va characteristic of FIG. 11. The thermistor 907 adjoining the charge roller 902 is built in a DC voltage power supply circuit 903' so as to output an optimum voltage Va with no regard to the environment. The charge voltage Vs to the drum 901 is maintained substantially constant. In this embodiment, a cleaning member 909 is held in contact with the charge roller 902 to clean the surface of the roller 902. At the same time, the cleaning member 909 serves to raise the surface temperature of the charge roller 902 rapidly by friction even when the ambient temperature is low, thereby enhancing the charging characteristic. Actually, when the temperature T was 12 degrees centigrade, Vs was −760 V for R of 16. 5 kΩ and Va of −1.65 kV; a desirable image was achieved with Vb maintained at −600 V.

[9th Embodiment]

Figure 14:
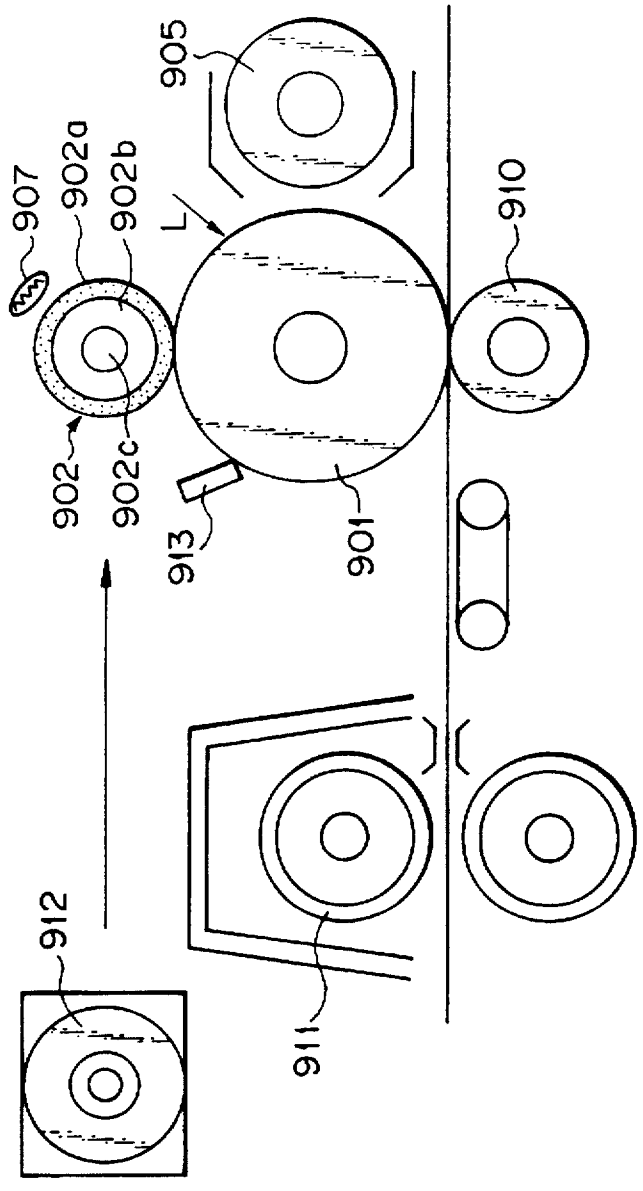

While the embodiments described so far can produce attractive images in an extremely short period of time even when the ambient temperature is low, a ninth embodiment to be described with reference to FIG. 14 is successful in further reducing the waiting time. As shown in FIG. 14, an image forming apparatus has image transferring means 910, a fixing unit 911 using a heat roller, an exhaust fan 912, and drum cleaning means 913 in addition to the photoconductive drum 901, charge roller 902, and developing unit 905. In this embodiment, carbon is dispersed in the conductive rubber layer *902b* of the charge roller 902, or a small amount of carbon is added to the surface resistance layer *902a* of the roller 902. This is to blacken the surface of the charge roller 902 for thereby enhancing the absorption of radiant heat.

Before the apparatus is used, the drum 901 and charge roller 902 are caused to idle and the exhaust fan 912 is rotated in the reverse direction, at the same time as the heater of the fixing unit 911 is turned on. Then, heat generated by the fixing unit 911 is conducted to the charge roller 902 to raise the surface temperature of the roller 902. As the temperature of the charge roller 902 reaches a predetermined one as sensed by the thermistor 907, the exhaust fan 912 is rotated in the exhausting direction. In this condition, the apparatus starts on an image forming operation. With such a procedure, it is possible to raise the surface temperature of the charge roller 902 in an extremely short time even when the apparatus has been left at a low temperature over a long period of time, thereby producing an image whose background is free from contamination. If desired, the bias control means and/or the charge roller voltage control means described in relation to the seventh and eighth embodiments may be added to the ninth embodiment for further reducing the waiting time.

Hereinafter will be described an irregular charge distribution particular to a conventional charge roller (having a resinous layer covering a conductive elastic layer) and occurring when a DC voltage is applied. The irregular charge distribution stems from the fact that the conductive elastic layer is implemented by a carbon and silicone rubber dispersion. This was found when use was made of a charge roller whose conductive elastic layer was made of epichlorohydrin rubber (a resinous overcoat on an epichlorohydrin rubber elastic layer) Specifically, the irregularity results from the non-uniform electric characteristic of the conductive elastic layer which in turn results from the incomplete dispersion of carbon and silicone rubber. The irregularity is eliminated when such a dispersion is replaced with epichlorohydrin rubber which is not dispersible.

Figures 15, 16:
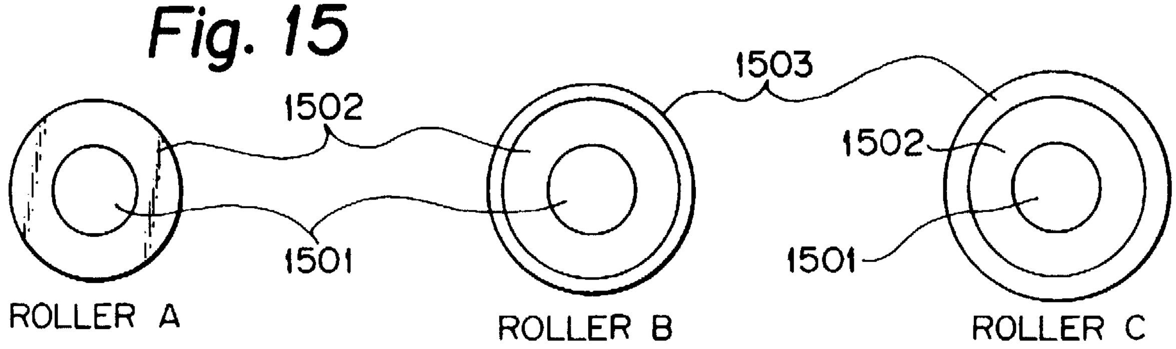
FIG. 15 are sections showing three kinds of charge rollers in accordance with the present invention.
FIG. 16 tabulates a relation between the thickness of epichlorohydrin rubber and the uniform charging and charging characteristic.

FIG. 15 shows three charge rollers which can set up a uniform charge distribution when only a DC voltage is applied thereto, i.e., even if an AC voltage is not superposed on the DC voltage. Specifically, a roller A is provided with a single layer of epichlorohydrin rubber (1 mm to 5 mm thick), while a roller B is provided with an epichlorohydrin rubber elastic layer (1 mm to 5 mm thick) and a fluoric resin surface layer (1 μm thick to 10 μm thick). Likewise, a roller C is provided with an epichlorohydrin rubber layer (1 mm to 5 mm thick) and a fluoric resin and epichlorohydrin dispersion layer (10 μm to 100 μm thick). If desired, in the single epichlorohydrin rubber layer (1 mm to 5 mm thick), the fluoric resin may concentrate in the surface portion. The thickness of the epichlorohydrin rubber layer is selected to be 1 mm to 5 mm since thicknesses less than 1 mm would fail to provide the layer with sufficient elasticity while thicknesses greater than 5 mm would increase the electric resistance or would, when heated by a heater, lower heat conductivity (i.e. the resistance would not decrease). FIG. 16 lists the results of experiments relating to the thickness of the epichlorohydrin rubber layer (1 mm to 5 mm thick).

[10th Embodiment]

An elastic layer (3 mm) of epichlorohydrin rubber is molded on an 8 ϕ metallic core 1501 such that the roller outside diameter is 14 ϕ. 100 parts of solution of epichlorohydrin rubber (2.5 wt % of solid) and 40 parts of solution of fluoric resin soluble to a solvent (10.8 wt % of solid) are applied to the elastic layer such that a 30 μm thick film is formed when dried. The resulting charge roller (roller C, FIG. 15) has a charging characteristic of Vs=−720 V against Va=−1400 V, confines the irregularity in charge potential Vs in a range of 10 V, and has a uniform charge distribution.

When superposed DC and AC is applied to the discharge roller, as in the conventional apparatus, a uniform charge distribution is attainable due to AC even when the latent image potential remains on the photoconductive drum or when some residual toner exists on the drum. However, to achieve a uniform charge distribution by DC only, it is necessary not only to use the charge roller (non-dispersion, epichlorohydrin elastic roller) of the invention, but also to cause the portion of the drum surface having been preexposed by a quenching lamp (QL) to enter the charging step first and to cause the portion of the same having the residual toner fully removed therefrom by the cleaning blade to enter the charging step first. When such requisites were satisfied, a uniform charge distribution was set up, as labeled II in FIG. 17. Without the QL, the charge distribution would be irregular since the residual potential would be added, as labeled I in FIG. 17. Further, if the cleaning were insufficient, the toner remaining on the drum would be transferred to the discharge roller and, thereafter, make the charge irregular at the period of the discharge roller, as labeled III in FIG. 13.

[11th Embodiment]

Figures 17, 18:
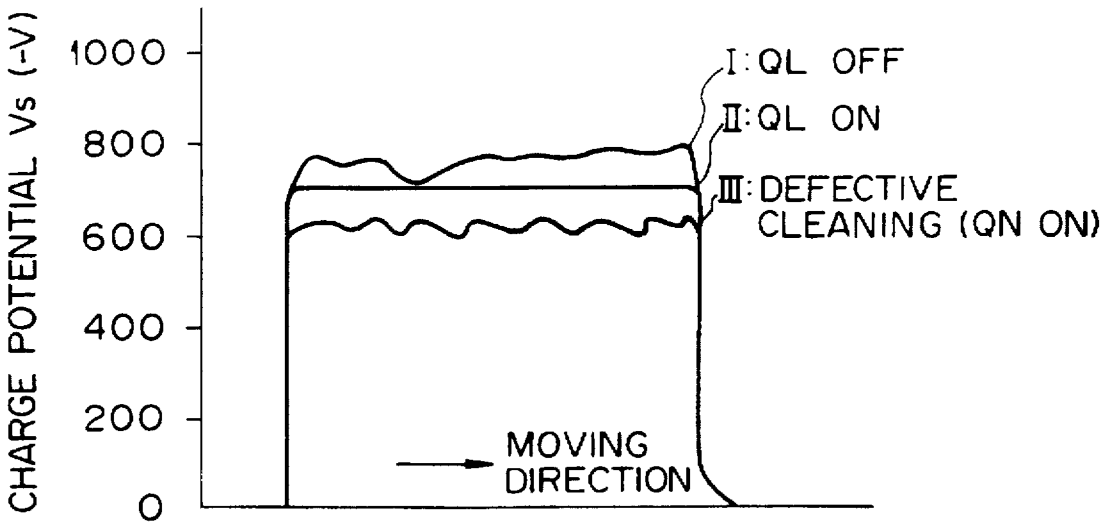
FIG. 17 is a graph indicative of the charging characteristic of a charge roller under various conditions.
FIG. 18 is a table for comparing ozone concentrations.
Figure 19A:
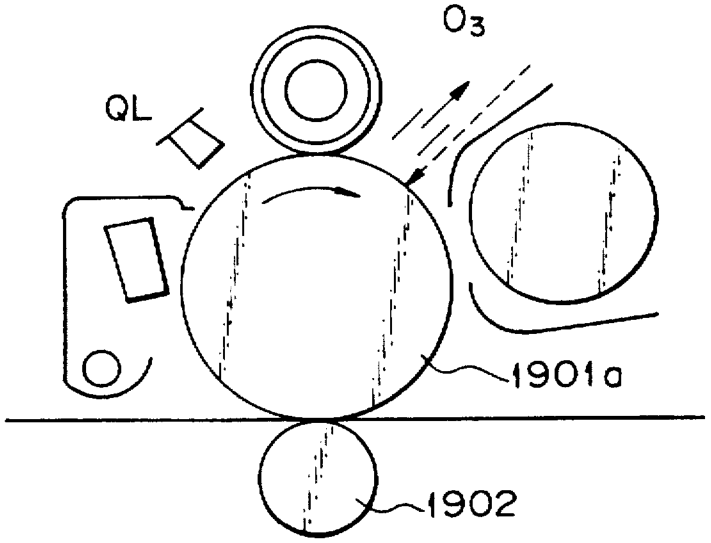
FIGS. 19A and 19B are sections showing another image forming apparatus in accordance with the present invention.
Figure 19B:
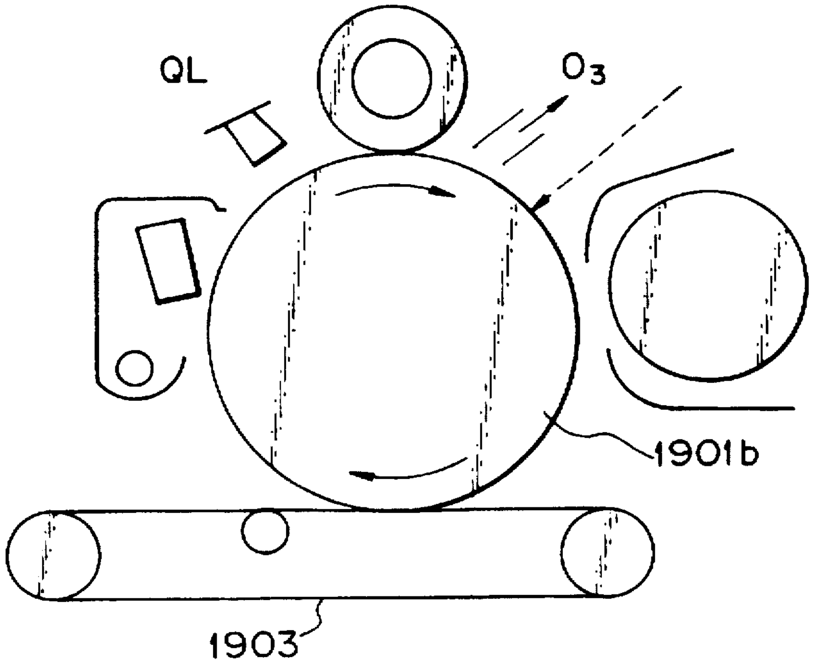

Ozone will sharply decrease if the image transfer device is also implemented by contact transfer in place of the conventional corona transfer. FIG. 18 tabulates ozone concentrations particular to roller charging and corona charging for comparison. FIGS. 19A and 19B show a specific construction of an image forming apparatus for practicing this embodiment. In the case of a photoconductive drum (or belt) 1901*a* having a small diameter to which a curvature type paper separation scheme is applied, image transfer by a transfer roller 1902 is effected (FIG. 19A). On the other hand, in the case of a photoconductive drum 1901*b* whose diameter is greater than 50 ϕ, image transfer using a transfer belt 1903 is effected (FIG. 19B). In the image forming apparatus wherein charging and image transfer are implemented by rollers and DC voltage only, the amount of ozone to be generated is reduced to 1/800 to 1/1000, compared to the corona charging and corona image transfer scheme, or reduced to 1/30 to 1/40, even compared to the roller charging and image transfer scheme using AC-superposed DC.

Figure 20A:
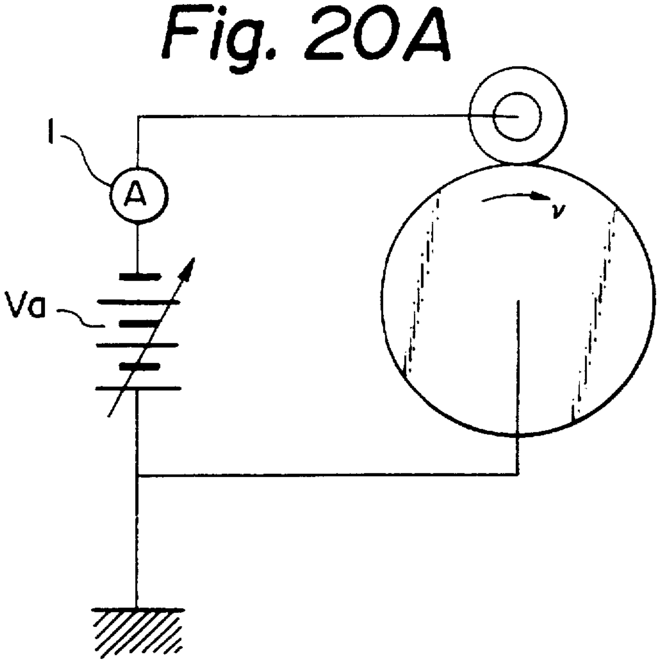
FIGS. 20A and 20B show a specific testing device applied to the present invention.
Figure 20B:
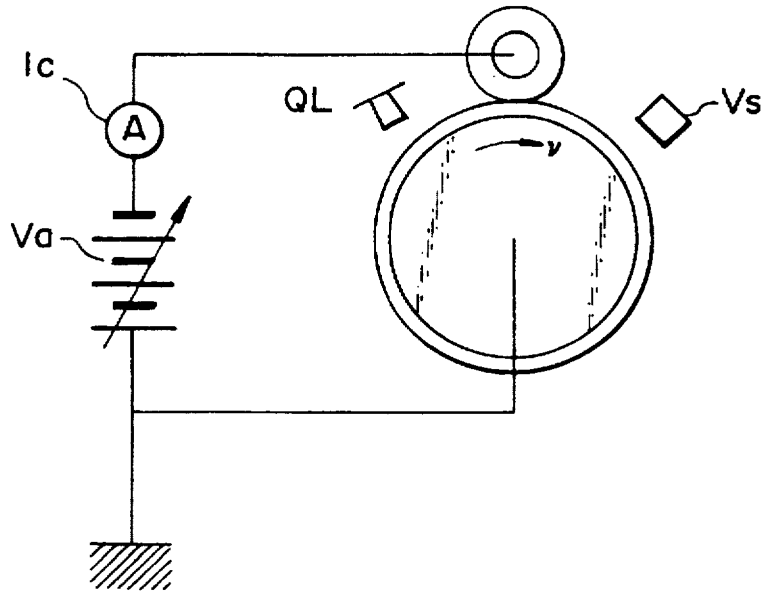
Figure 21A:
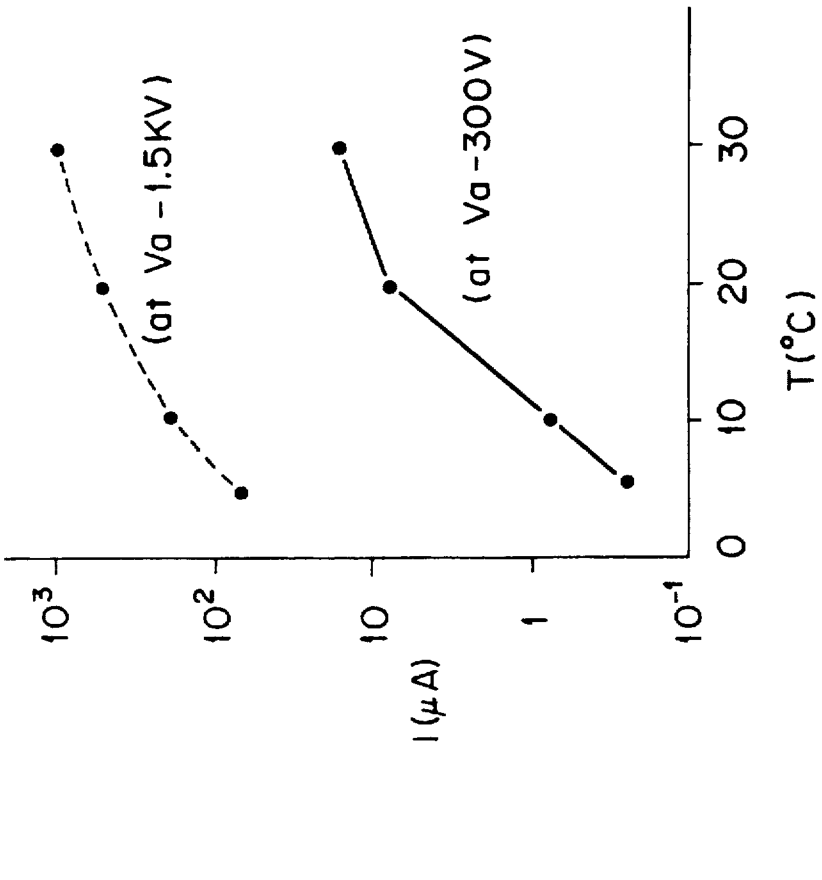
FIGS. 21A and 21B plot the dependency of various characteristics of a charge roller in accordance with the present invention on temperature.
Figure 21B:
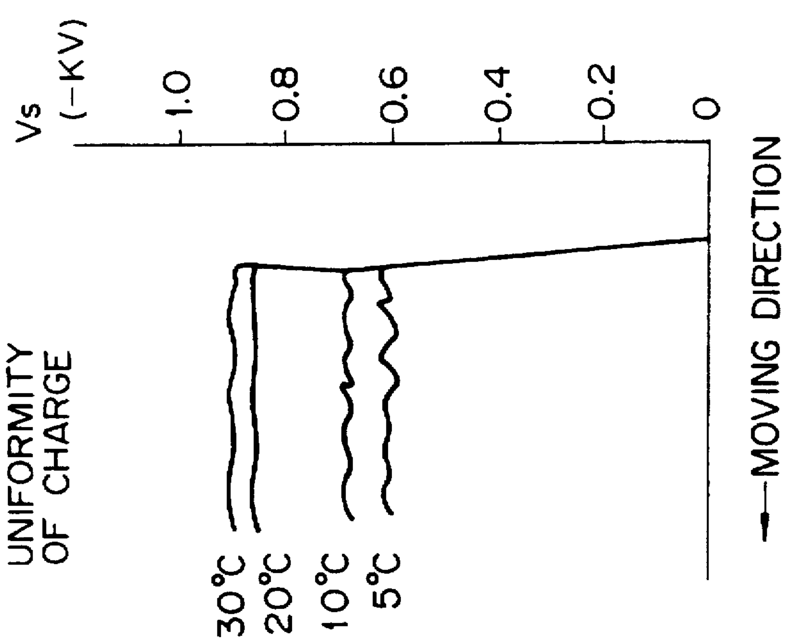
Figure 22A:
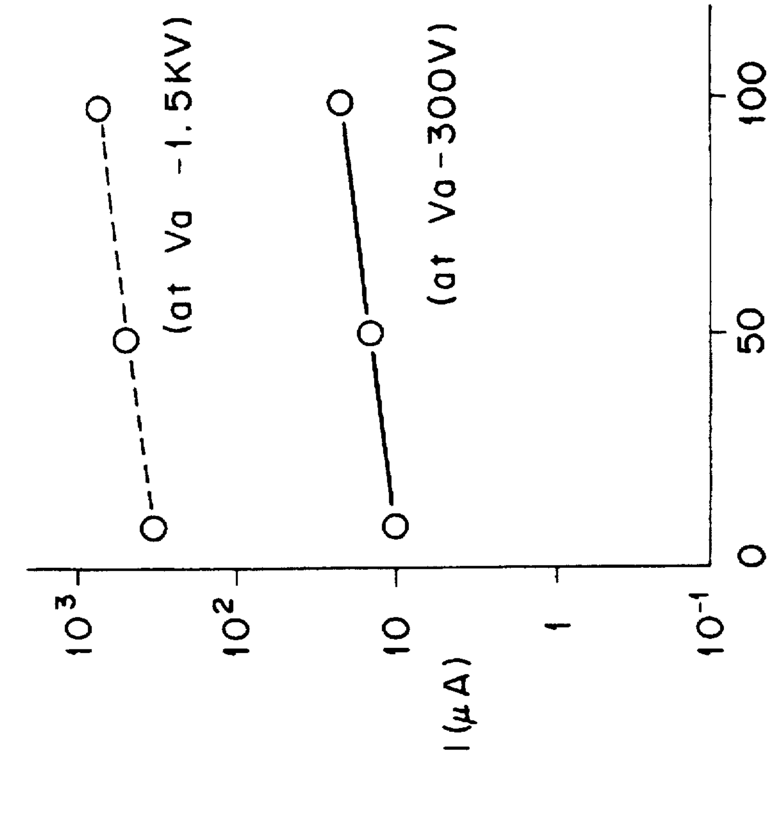
FIGS. 22A and 22B plot the dependency of various characteristics of a charge roller in accordance with the present invention on humidity.
Figure 22B:
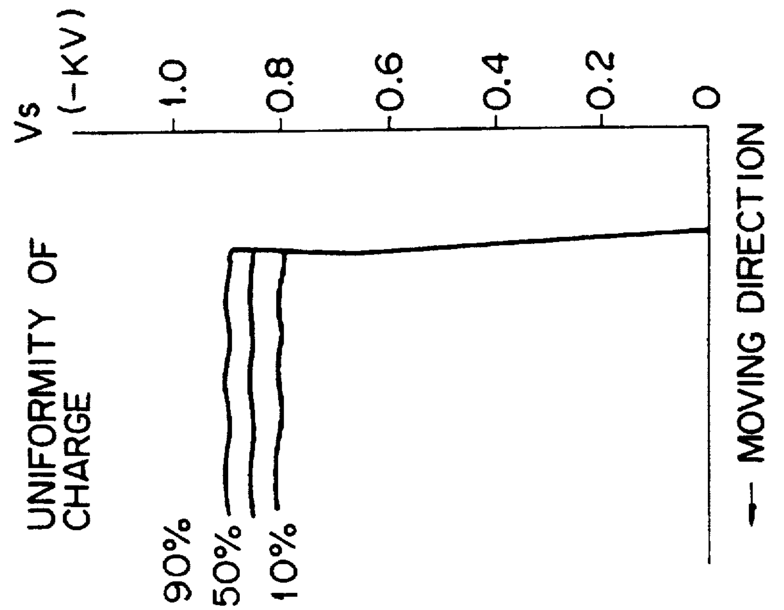

An elastic layer of epichlorohydrin (4 mm thick) is molded on an 8 ϕ metallic core 1501 such that the roller outside diameter is 16 ϕ, whereby a charge roller (roller A, FIG. 15) is produced. The charge roller was evaluated with respect to the dependency of an I-Va characteristic and Vs-Va characteristic on temperature and humidity by using testing devices shown in FIGS. 20A and 20B (FIGS. 21A and 21B/FIGS. 22A and 22B). As shown, the resistance (=Va/2) of the epichlorohydrin rubber layer greatly depends on temperature (FIG. 21A), but it depends on humidity little (FIG. 22A). It follows that the charging characteristic of such a layer (charge potential Vs and uniform charge distribution) is noticeably effected by temperature (FIG. 21B), i.e., Vs and uniformity both are lowered at temperatures lower than 10 degrees centigrade. However, the charging characteristic is not noticeably effected by humidity (FIGS. 22A and 22B). Hence, to charge the photoconductive element to a constant charge and in a uniform distribution despite the use of the charge roller with an epichlorohydrin rubber layer, a first prerequisite is that the charge roller be used at temperatures higher than 10 degrees centigrade. A second prerequisite is that the voltage to the charge roller be corrected in matching relation to changes in roller temperature as sensed by the thermistor.

[12th Embodiment]

Figure 23:
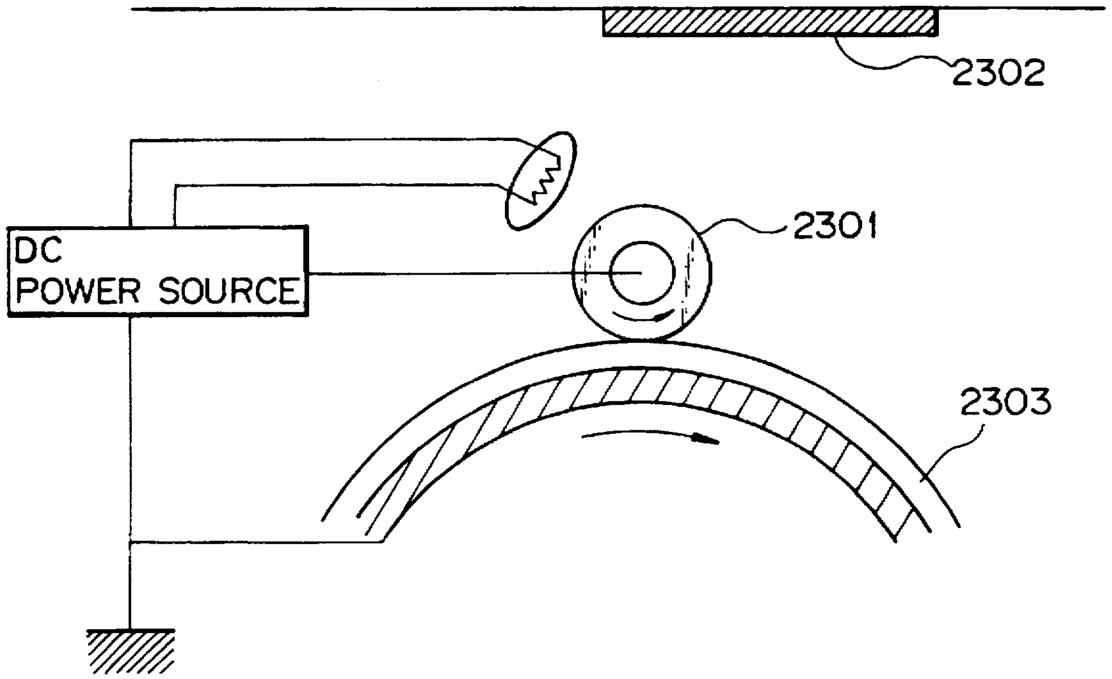
FIGS. 23, 24 and 25 are sections each showing another image forming apparatus in accordance with the present invention.

As shown in FIG. 23, a charge roller 2301 is implemented by a 4 mm thick elastic roller made of epichlorohydrin rubber. A heater 2302 (radiator of 30×200 m $m^2$, 220 V, and 18 W) is located above the charge roller 2301 for eliminating dew condensation. In winter and at nighttime, the heater 2302 is turned on to prevent the temperature inside the apparatus from falling beyond 5 degrees centigrade. Hence, since the roller temperature is higher than 10 degrees centigrade when an image should be formed in winter or early morning, a desirable charging characteristic and, therefore, an attractive image is produced by DC. In addition, since the heater 2302 frees even the optical arrangement and drum 2303 from dew condensation, defective images are also eliminated.

[13th Embodiment]

Figure 24:
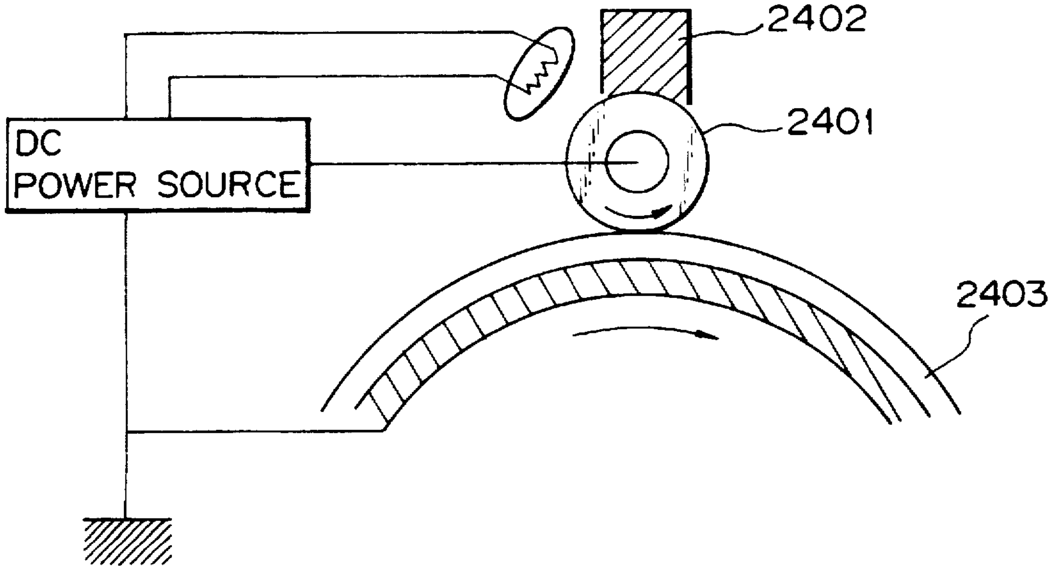

As shown in FIG. 24, a charge roller 2401 has a 3 mm thick epichlorohydrin rubber layer or elastic layer, and a 1 μm to 3 μm thick overcoat layer of fluoric resin on the elastic layer. A cleaning member 2402 is pressed against the charge roller 2401 to clean the surface of the latter. As the charge roller 2401 is rotated, the cleaning blade 2402 not only cleans the roller 2401 but also raises the surface temperature of the roller 2401 due to friction. In winter or early morning, a drum 2403 is caused to idle before actual image formation in order to raise the surface temperature of the charge roller 2401 to above 10 degrees centigrade. This is successful in restoring the charging characteristic to normal one. The cleaning member 2402 may be constantly held in contact with the discharge roller 2401 or may be brought into contact with the roller 2401 only when the drum 2403 idles before image formation.

[14th Embodiment]

Figure 25:
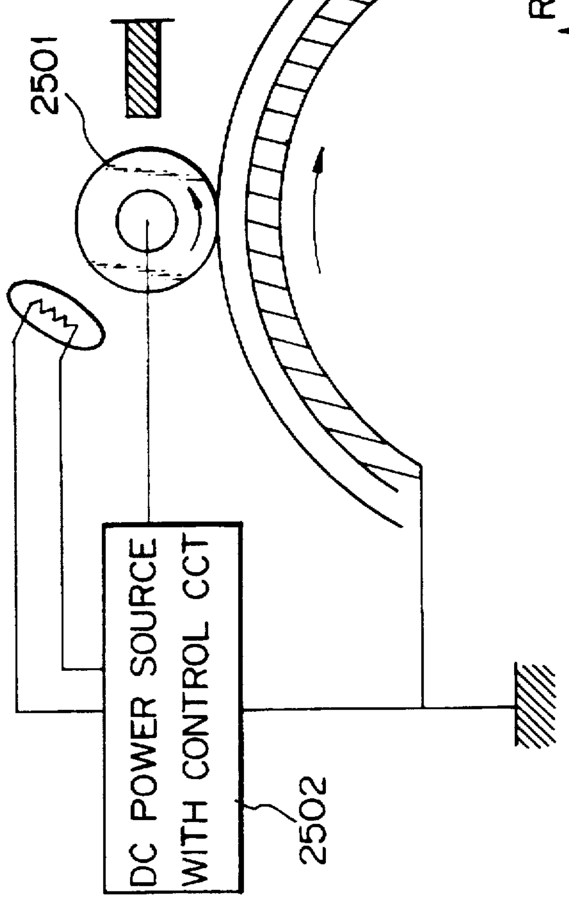
Figure 26:
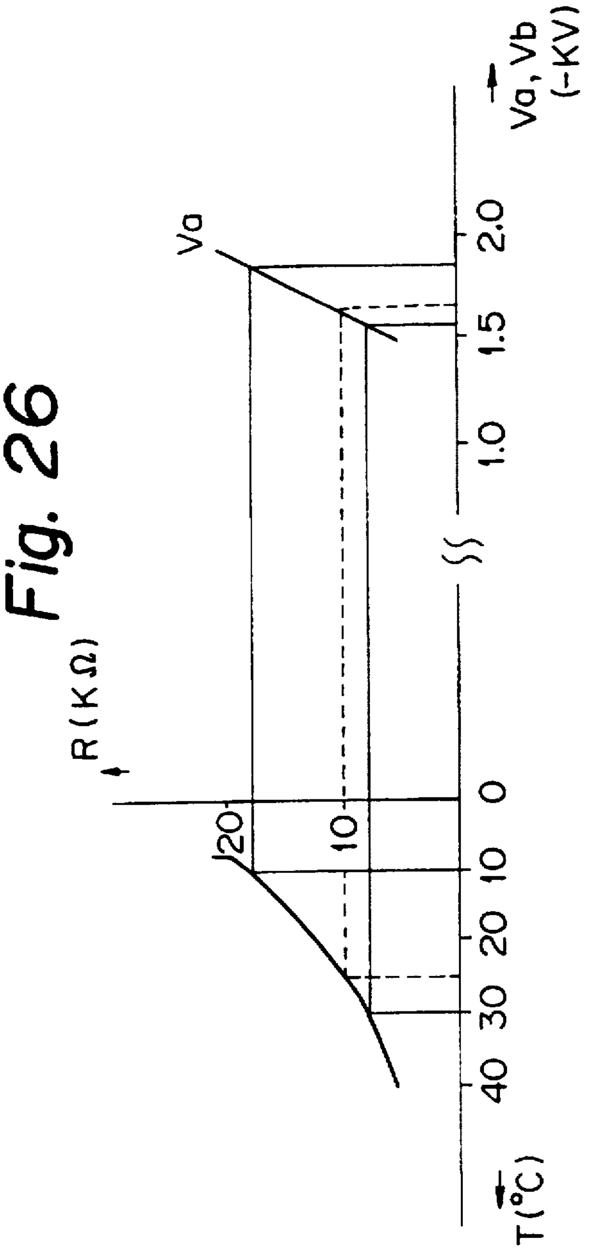
FIG. 26 is a graph indicative of a relation of the surface temperature of a charge roller, the resistance of a thermistor, and a voltage applied to the discharge roller.

FIG. 25 shows a roller charging device using a charge roller 2501 identical with the charge roller of the tenth embodiment. FIG. 26 plots a relation of the roller surface temperature T (degrees centigrade), thermistor resistance R (kΩ) and roller voltage Va (kV) derived from the temperature characteristic of the charge roller 2501. In a power source 2502 of FIG. 25, a control circuit is built in for determining a voltage matching the instantaneous roller temperature on the basis of the T-R-V characteristic. With the illustrative embodiment, it is possible to set up a constant charge potential at all times even when the charge roller depends on temperature, since a voltage matching the roller temperature is outputted.

Hereinafter will be described an irregular charge distribution particular to a conventional charge roller (having a resinous layer covering a conductive elastic layer) and occurring when a DC voltage is applied. The irregular charge distribution stems from the fact that the conductive elastic layer is implemented by a carbon and silicone rubber dispersion. This was found when use was made of a charge roller whose conductive elastic layer was made of urethane rubber not containing carbon or containing a small amount of alkaline metal salt. Specifically, the irregularity results from the non-uniform electric characteristic of the conductive elastic layer which in turn results from the incomplete dispersion of carbon and synthetic rubber. The irregularity is eliminated when such a dispersion is replaced with undispersible urethan rubber.

Figure 27:
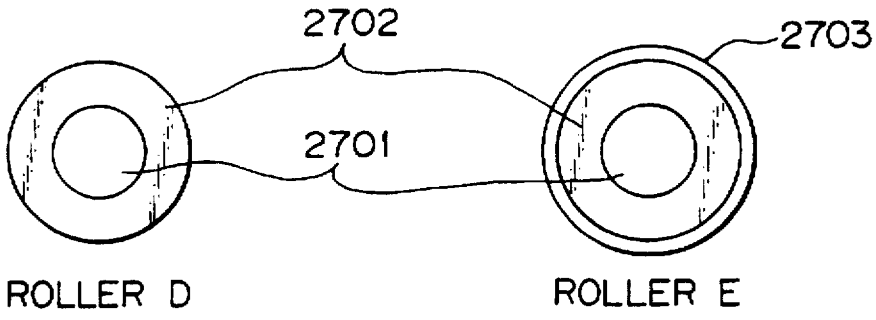
FIG. 27 is a section showing other discharge rollers in accordance with the present invention.

FIG. 27 shows rollers D and E which can set up a uniform charge distribution when only a DC voltage is applied, i.e., even when an AC voltage is not superposed on a DC voltage. As shown, the roller D has a metallic core 2701, and a 1 mm to 5 mm thick elastic layer 2702 of urethan rubber with or without an alkaline metal salt contained therein. The roller E has a 1 μm to 30 μm thick surface layer 2703 of non-adhesive resin provided on the elastic layer 2702. Specifically, the elastic layer 2702 is implemented only by urethane rubber whose electric resistance is $10^6$ Ω.cm to $10^{10}$ Ω.cm or by urethane rubber containing an alkaline metal salt and not by the dispersion of carbon or similar conductive particles. This insures a desirable resistance to voltage and electrically uniformizes the entire elastic layer. Further, since urethane rubber has suitable hardness and provides an adequate surface configuration, even the roller D suffices. However, when a charge roller having a higher performance is desired, use may be made of the roller E having the surface layer 2703 of non-adhesive resin (e.g fluoric resin or silicone resin).

[15th Embodiment]

Figure 28:
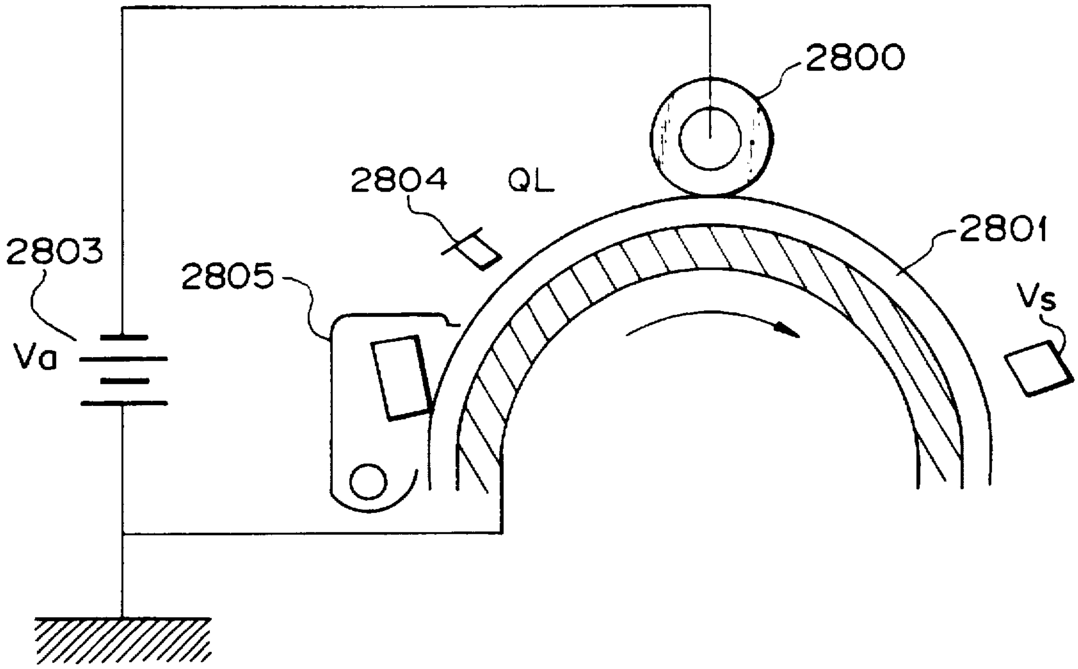
FIG. 28 is a section showing an image forming apparatus implemented with a discharge roller in accordance with the present invention.

An elastic layer 2701 of urethane rubber (3 mm thick) is molded on an 8 ϕ metallic core 2701 such that the roller outside diameter is 14 ϕ (roller D, FIG. 27). The elastic layer 2701 has an electric resistance of $3\times10^9$ Ω.cm (at temperature of 20 degrees centigrade and humidity of 50 percent). FIG. 28 shows part of an image forming apparatus using a charge roller 2800 of the embodiment. As shown, the apparatus has a photoconductive drum 2801 provided with a 30 μm thick photoconductive layer. A power source 2803 applies a DC voltage (Va). A quenching lamp (QE) 2804 is implemented by light emitting diodes (LEDs). A blade cleaning unit 2805 removes the toner remaining on the drum 2801. The charge roller 2800 has a charging characteristic Vs=−800 V against Va=−1500 V, confines the irregularity in charge potential Vs in a range of about 15 V, and sets up a uniform charge distribution.

Figure 29:
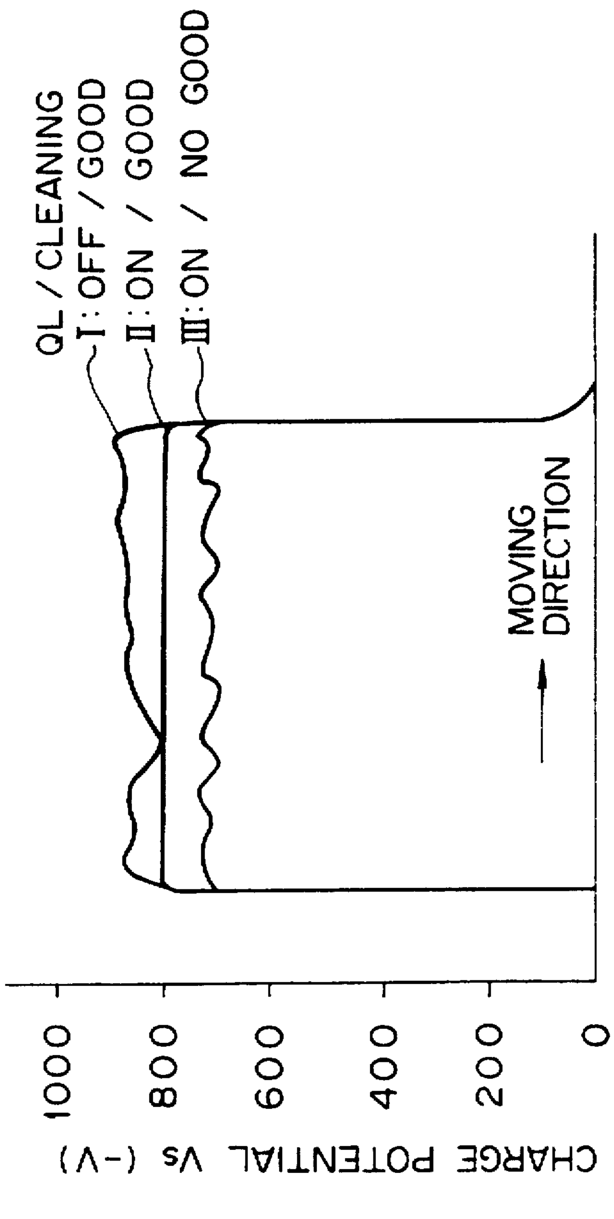
FIG. 29 plots the charging characteristic of a charge roller under various conditions.

When AC-superposed DC is applied to a charge roller, as in the conventional apparatus, a uniform charge distribution is achieved due to AC even when a potential remains on a photoconductive element or when some toner remains on the element. On the other hand, to set up a uniform charge distribution by a DC voltage only, it is necessary to cause part of the photoconductive element having been preexposed by the QL to enter the charging step first and to cause part of the surface of the element having the residual toner fully removed by a cleaning blade to enter the charging step first., in addition to use a charge roller with an elastic layer which is made of urethane rubber containing or not containing an alkaline metal salt and having an electric resistance of $10^6$ Ω.cm to $10^{10}$ Ω.cm. In this condition, a uniform charge distribution is achievable, as labeled II in FIG. 29. When the QL is not used, the charge distribution is not uniform since the residual potential is added, as labeled I in FIG. 29. Further, when the cleaning is not sufficient, the toner remaining on the photoconductive element is transferred to the charge roller and, thereafter, causes irregular charging to occur at the period of the roller, as labeled III in FIG. 29.

[16th Embodiment]

An elastic layer 2702 of urethane rubber (4 mm thick) is molded on an 8 ϕ metallic core 2701 such that the roller outside diameter is 16 ϕ. Since the elastic layer 2702 contains 0.5 wt % of perchloric acid lithium salt, it has an electric resistance of $3\times10^8$ Ω.cm (at temperature of 20 degrees centigrade and humidity of 50 percent). A solution of fluoric resin soluble to a solvent (10.8 wt % of solid) is applied to the elastic layer 2702 such that a 5 μm thick film or surface layer 2703 is formed when dried (roller E, FIG. 27). When the charge roller of this embodiment was substituted for the charge roller (roller D) of the fifteenth embodiment, the former was found to be comparable with the latter with respect to the advantages.

Among various kinds of synthetic rubbers, urethane rubber implements an elastic body superior in low hardness, wear resistance, resistance to compression strains, and strength. Urethane rubber is, therefore, optimum for the elastic layer of the charge roller in respect of strength and hardness. However, the problem is that urethane rubber has a high electric resistance and is extremely susceptible to environment.

Figures 30, 31:
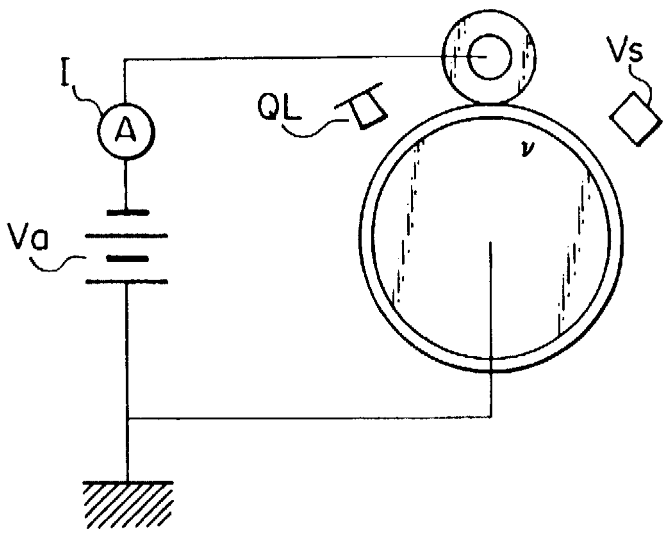
FIG. 30 tabulates the amounts of perchloric acid lithium salt added to urethane rubber and electric resistances.
FIG. 31 is a section of a specific testing device applicable to a charge roller in accordance with the present invention.

The resistance of urethane rubber can be reduced if an alkaline metal salt is introduced in urethane rubber. Further, the alkaline metal salt differs from the dispersion of carbon or similar conductive particles in that it does not render the resistance irregular (see Japanese Patent Laid-Open Publication No. 189876/1988). Optimum one of alkaline metal salts is perhalogenous oxyacid. FIG. 30 shows a specific relation between the concentration of perchloric acid lithium salt of urethane rubber and the electric resistance.

Figure 32A:
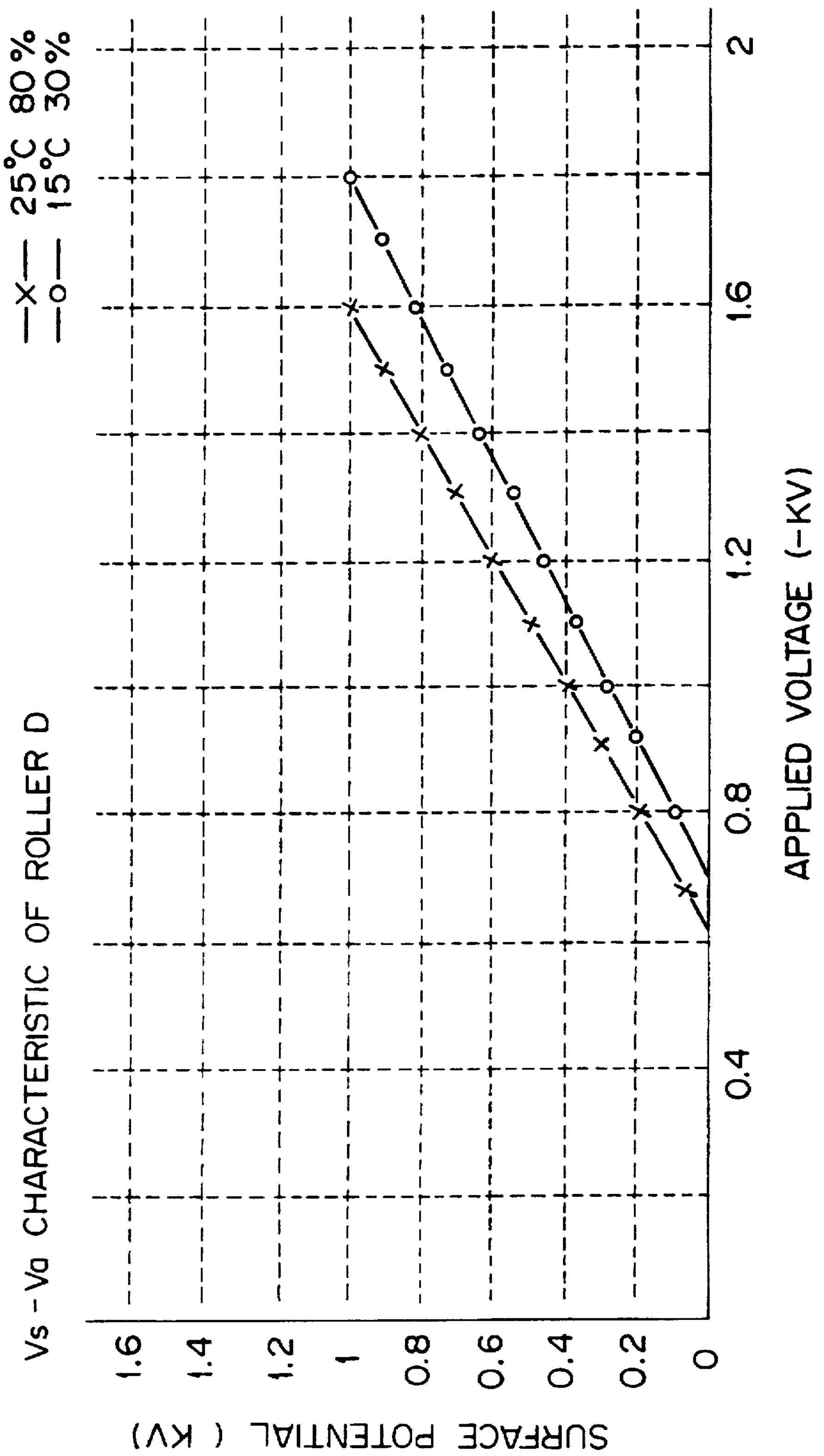
FIGS. 32A and 32B plot the result of test conducted with the device of FIG. 31.
Figure 32B:
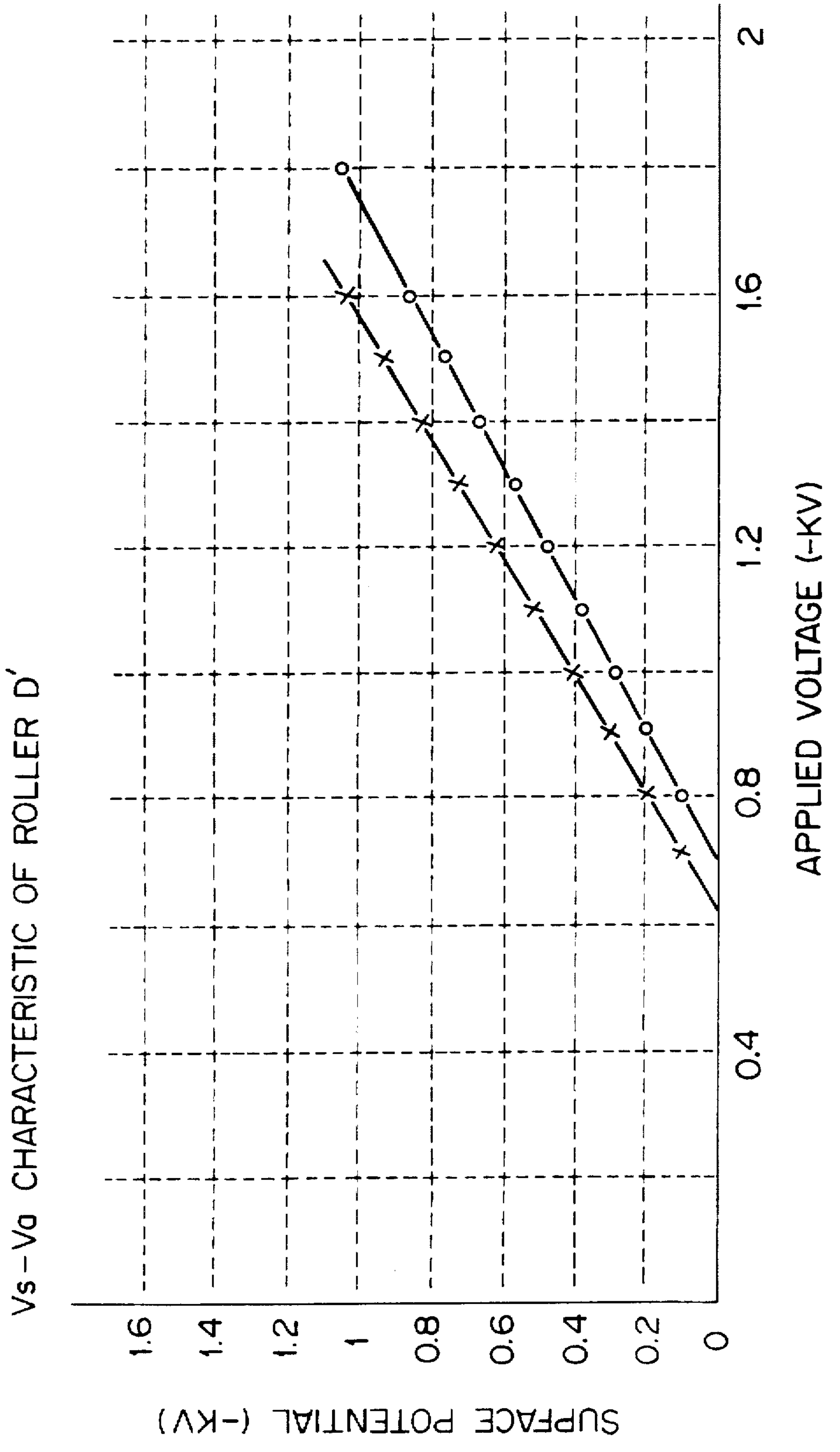
Figure 33:
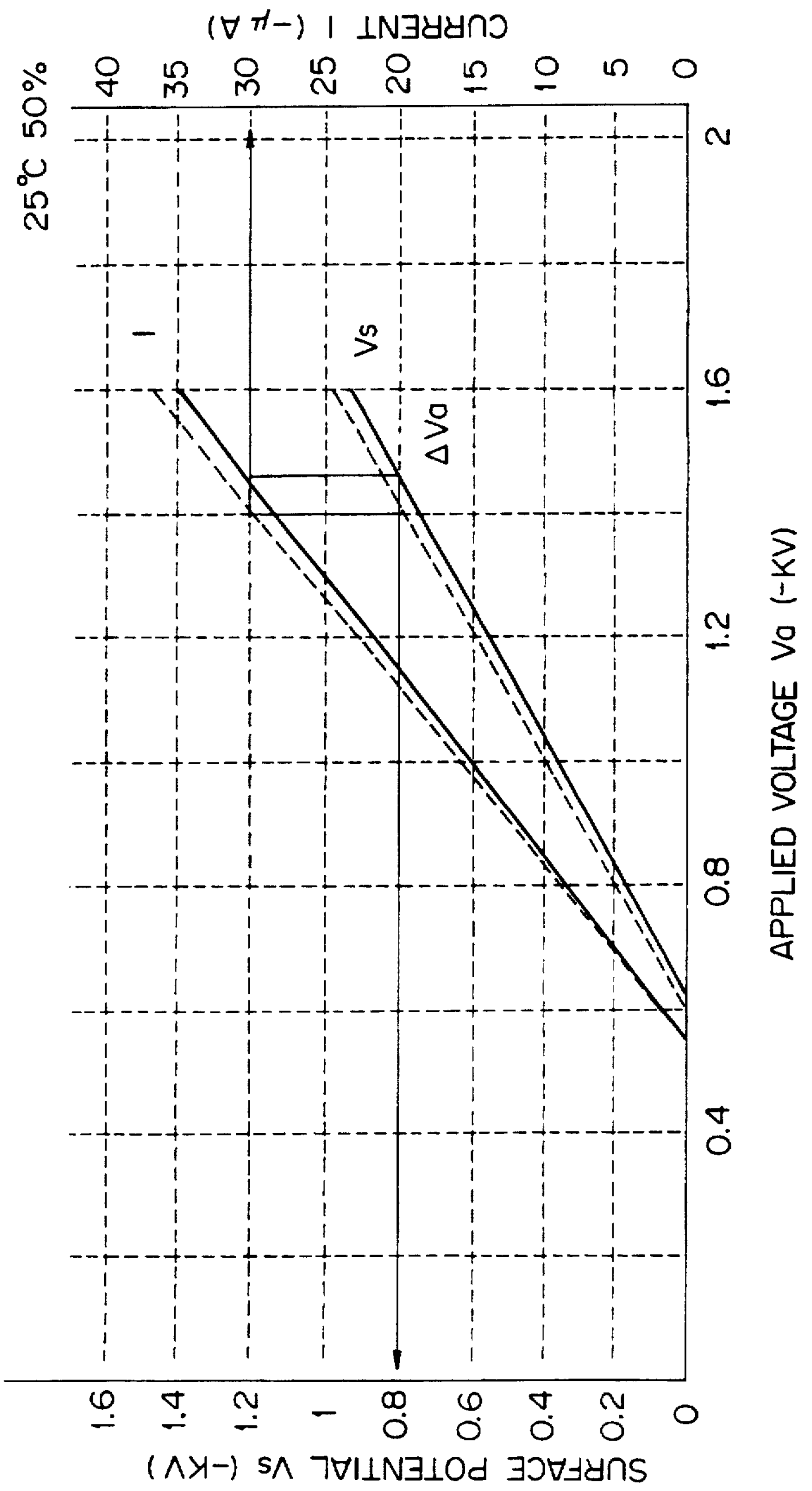
FIG. 33 plots an I-Vs characteristic and a Vs-Va characteristic of a charge roller in accordance with the present invention measured at a temperature of 25 degrees centigrade and a humidity of 50 percent.

To cope with the susceptibility of the electric resistance of urethane rubber to environment, the following measure may be taken. For experiment, the roller D, FIG. 27, and a roller D' with 0.05 wt % of perchloric acid lithium salt added thereto were used. The Vs-Va characteristic of each of the rollers D and D' was measured by a testing device shown in FIG. 31 in two different environments, i.e., one in which the temperature and humidity were 25 degrees centigrade and 80 percent, respectively and one in which the temperature and humidity were 15 degrees centigrade and 30 percent, respectively. FIGS. 32A and 32B show respectively the measured Vs-Va characteristics of the rollers D and D'. Why the rollers D and D' both change in charging characteristic in the above environments is that the electric resistance of each roller changes depending on the environment. In FIG. 31, a current to I to be measured is a power source current associated with the voltage Va and, at the same time, a charge current for charging the photoconductive drum to Vs. Therefore, despite the change in the electric resistance of the charge roller, it is possible to maintain the charge potential Vs of the drum constant only if the current I is maintained constant. FIG. 33 shows the I-Vs characteristic and Vs-Va characteristic of each of the rollers D (solid line) and D' (dotted line) determined at the temperature of 25 degrees centigrade and the humidity of 50 percent. When the voltage power source is implemented as a constant DC power source, the applied voltage ΔVa changes such that the current I becomes 30 μA with either of the rollers D and D', whereby Vs=800 V is obtained. This method is applicable to the change in the electric resistance of each roller ascribable to environment.

[17th Embodiment]

The rollers D and D' stated above were used in two different environments, i.e., one in which the temperature was 15 degrees centigrade and the humidity was 30 percent and one in which the temperature was 25 degrees centigrade and the humidity was 80 percent. When the power source of the apparatus shown in FIG. 28 was implemented as a constant current DC power source, the charge potential Vs of the photoconductive drum was measured to be 800±25 V for a constant current I of 30±1 μA. Since to use a constant current power source means to apply a constant current to the photoconductive drum at all times, the prerequisite is that the potential and toner remaining on the surface of the drum be fully removed before charging.

[18th Embodiment]

Figure 37:
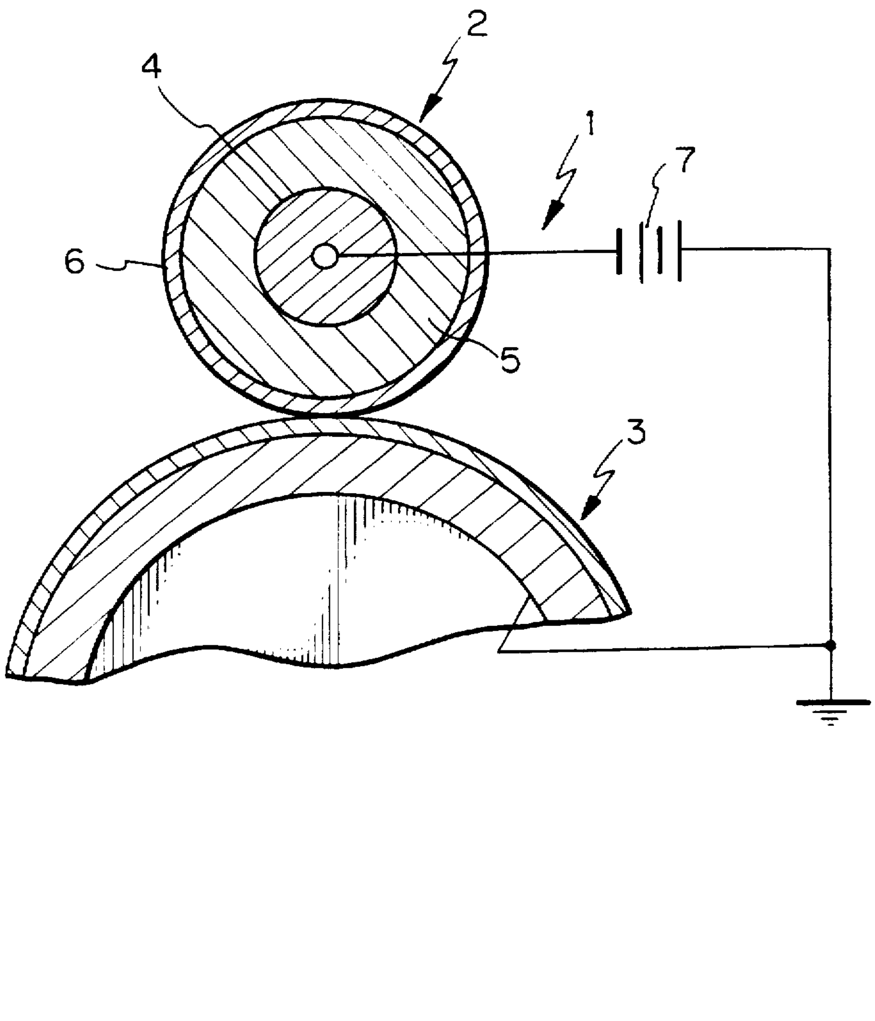
FIG. 37 is a section showing a charging device implemented with a charge roller of the present invention.

As shown in FIG. 37, a charge roller 2 has a metallic core 4, an elastic layer 5 formed on the core 4, and a surface layer 6 formed on the elastic layer 5. A DC power source 7 applies a high-tension negative DC voltage of 1.3 kV to 1.6 kV to cause it to charge a photoconductive drum 3. The elastic layer 5 is made of epichlorohydrin rubber having a medium electric resistance and in which conductive particles are not dispersed. The epichlorohydrin rubber may be implemented by a binary copolymer of epichlorohydrin/ethylene oxide or a ternary copolymer of epichlorohydrin/ethylene oxide/arylglycydil ether.

The surface layer 6 is constituted by a mixture of epichlorohydrin rubber applied to the elastic layer 5 and non-adhering fluorine-based resin. This is to enhance the non-adhering property of the surface of the charge roller 2 against the deposition of toner particles without lowering the charging efficiency to a noticeable degree. The fluorine-based resin is an amorphous polymer soluble to a solvent and produced by the copolymerization reaction of fluoroolefin and hydrocarbon-based vinyl ether. For details of this kind of resin, a reference may be made to Kojima et al "Journal of the Institute of Organic Synthetic Chemical Engineers of Japan", Vol. 42 (8), page 841, 1984 and Munakata et al "Asahi Glass Study Report (Japan)", Vol. 34 (2), pages 205–224, 1984. The fluorine-based resin has a relatively low fluorine content, i.e., 25 wt % to 32 wt %. However, since the resin of this kind is an alternating copolymer in which fluoroolefin and hydrocarbon vinyl ether alternate with each other, the fluoroolefin portions which are thermochemically stable and regularly arranged protect the unstable hydrocarbon-based vinyl ether portions electronically and sterically. Hence, such a resin is chemically stable and durable. The resin, or amorphous polymer, is soluble to a solvent and, therefore, has to be bridged after application, thereby providing the resulting film with resistivity to solvents. For this purpose, hydroxyl group-containing vinyl ether which is highly reactive is copolymerized with fluoroolefin so as to produce a resin structure which promotes easy bridging by isocyanate.

The above structure allows the elastic layer 5 to function with stability and uniformity as an electric resistance body and has a small electrostatic capacity. Therefore, even when AC is superposed on DC, the uniform charging ability is not improved to a noticeable degree. As a result, it is not necessary to superpose AC on DC, i.e., high-tension DC voltage should only be applied.

In a first example of this embodiment, to produce the elastic layer 5, there were mixed 100 parts by weight of epichlorohydrin rubber which is a ternary copolymer of epichlorohydrin/ethylene oxide/arylglycydil ether (Epichloma CG available from Daiso (Japan)), 30 parts by weight of more volatile calcium carbonate, 10 parts by weight of factice (GT available from Tenman Sub Chemicals (Japan)), 5 parts by weight of zinc flower, 0.5 part by weight of stearic acid, 1 part by weight of vulcanization accelerator (Nocseler TT available from Ouchi Shinko Chemicals (Japan), 1.5 parts by weight of Nocseler DM also available from Ouchi Shinko Chemicals, and 0.25 part by weight of Sulphax H available from Tsurumi Chemicals (Japan). The mixture was kneaded to prepare a compound having a uniform composition. Then, the mixture was applied to the periphery of a shaft made of stainless steel and having a diameter of 6 mm. Subsequently, the shaft was vulcanized at 170° C. for 10 minutes and again vulcanized at 200° C. for 2 hours. The surface of the resulting roller was machined to have a roller diameter of 12 mm. The roller was measured to have a medium electric resistance and, physically, a volume resistivity of $2\times10^8$ Ω.cm, rubber hardness of 33° (JIS A), and surface roughness of 3 μm.Rz.

To form the surface layer 6, there were mixed 100 parts by weight of epichlorohydrin rubber of ternary copolymer (Epichroma CG available from Daiso), 0.5 part by weight of stearic acid, 5 parts by weight of zinc flower, 1 part by weight of vulcanization accelerator (Nocseler TT available from Ouchi Shinko Chemicals), 1.5 parts by weight of Nocseler DM also available from Ouchi Shinko Chemicals, and 0.25 part by weight of Sulphax H available from Tsurumi Chemicals. The mixture was kneaded to prepare a compound having a uniform composition. 2.5 parts by weight of the compound was dissolved in a mixture solution of 48.8 parts by weight of toluen and 48.8 parts by weight of 4-methyl-2-pentanone, thereby producing an epichlorohydrin rubber solution containing 2.5% of solids (paint A-1). Also, to produce the non-adhering resin, 22 parts by weight of solvent-soluble fluorine resin (Lumifun LF-601C major agent available from Asahi Glass (Japan)) and 4.4 parts by weight of isocyanate-based hardener (Lumifun LF-601C hardener also available from Asahi Glass) were dissolved in a mixture of 36.8 parts by weight of toluen and 36.8 parts by weight of xylene. The resulting fluorine-based resin solution contained 10% of solids (paint B). 40 parts by weight of paint B and 100 parts by weight of paint A-1 were mixed (ratio in solid: paint A1/paint B=1.0/1.6). After the mixture of paints B and A-1 were coated on the elastic layer 5 by dipping, it was dried at 160° C. for 30 minutes to form a 20 μm thick layer. This surface layer 6 had a volume resistivity of $8\times10^9$ Ω.cm.

The charge roller 2 fabricated by the above procedure was substituted for a primary corona charger included in a positive-to-positive development type copier (FT3300 available from Ricoh (Japan)). In this condition, the roller 2 was held in contact with and rotated by the drum 3 while a DC voltage of 1.4 kV was applied to the core 4 thereof as a primary charge voltage. Table 1, which is shown below, indicates a light potential measured with the charge roller 2 together with the result of evaluation of an image in a row labeled Ex. (Example) 1. Even after the copier was operated to produce 5,000 copies, the potential and image were free from defects. For the measurement of the volume resistivity of the elastic layer 5, each sample was left in a 20° C., 60% RH atmosphere for 16 hours, use was made of an electrometer 610C, and an electrode for measurement was implemented by a tape of copper foil (No. 1245 available from 3M). Further, to measure the volume resistivity of the surface layer alone, the material constituting it was painted on a thin aluminum plate (0.2 mm thick) to a thickness of about 50 μm. Then, the aluminum plate was left in a 20° C., 60 RH atmosphere for 16 hours; for the measurement, use was made of a resistance measuring cell (16008A available from YHP) and above-mentioned electrometer 610C.

| Ex. No. | Elastic Layer (Volume Resistivity Ω · cm) | Surface Layer (Volume Resistivity Ω · cm) | Surface Layer Thickness (μm) | Potential (V) | Image Defect | Toner Filming |
|---|---|---|---|---|---|---|
| Ex. 1 | Epichloma CG | fluorine/ Epichloma CG | 20 | −730 | not occurred | not occurred |
| | ($2 \times 10^8$) | ($8 \times 10^9$) | | −725 | not occurred | not occurred |
| Ex. 2 | Same as above | same as above | 90 | −720 | not occurred | not occurred |
| | | | | −720 | not occurred | not occurred |
| Ex. 3 | Epichloma C | fluorine/ Epichloma C | 20 | −740 | not occurred | not occurred |
| | ($7 \times 10^7$) | ($3 \times 10^9$) | | −740 | not occurred | not occurred |
| Ex. 4 | Epichloma CG/Epichloma | fluorine resin/ Epichloma | 6 | −800 | not occurred | not occurred |
| | ($1 \times 10^8$) | ($1 \times 10^{10}$) | | −795 | not occurred | not occurred |
| Ex. 5 | Epichloma CG | fluorine resin ($2 \times 10^{14}$) | 8 | −720 | not occurred | not occurred |
| | ($2 \times 10^8$) | | | −720 | not occurred | not occurred |
| Ex. 6 | Epichloma C | same as above | 5 | −740 | not occurred | not occurred |
| | ($7 \times 10^7$) | | | −735 | not occurred | not occurred |
| Com. Ex. 1 | Epichloma CG | — | — | −800 | not occurred | not occurred |
| | ($7 \times 10^8$) | | | −740 | occurred (irregular density) | occurred |
| Com. Ex. 2 | Epichloma CG ($2 \times 10^8$) | fluorine resin/ Epichloma CG | 230 | −670 | occurred (irregular density) | not occurred |
| | | ($8 \times 10^9$) | | — | — | — |
| Com. Ex. 3 | Epichloma CG/Epichloma C | fluorine resin ($2 \times 10^{14}$) | 30 | 590 | occurred (low density) | not occurred |
| | ($1 \times 10^8$) | | | — | — | — |
| Com. Ex. 4 | Epichloma CG ($2 \times 10^8$) | fluorine resin ($2 \times 10^{14}$) | 11 | 660 | occurred (slightly low density) | not occurred |
| | | | | — | — | — |
| Com. Ex. 5 | Same as above | same as above | 15 | 620 | occurred (low density) | not occurred |
| | | | | — | — | — |

In each Example shown in Table 1, the upper and lower parts of the columns "Potential (V)", "Image Defect", and "Toner Filming" are respectively representative of the initial condition and the condition after 5,000 copies have been produced.

In Table 1, Example 2 is identical with Example 1 described above except that the surface layer 6 was 90 μm thick.

In Example 3, to produce the elastic layer 5, there were mixed 100 parts by weight of epichlorohydrin rubber of binary copolymer of epichlorohydrin/ethylene oxide (Epichroma C available from Daiso), 30 parts by weight of more volatile calcium carbonate, 10 parts by weight of factice (GT available from Tenman Sub Chemicals), 5 parts by weight of zinc flower, 0.5 part by weight of stearic acid, 1 part by weight of vulcanization accelerator (Nocseler TT available from Ouchi Shinko Chemicals), 1.5 parts by weight of Nocseler DM also available from Ouchi Shinko Chemicals, and 0.25 part by weight of Sulfax H available from Tsurumi Chemicals were mixed and kneaded to prepare a compound having a uniform composition. The compound was applied to the periphery of a shaft made of stainless steel and having a diameter of 6 mm, vulcanized at 170° C. for 10 minutes, and then vulcanized at 200° C. for 2 hours. The surface of the resulting roller was machined to provide the roller with a diameter of 12 mm. The roller was measured to have a medium electric resistance and, physically, a volume resistivity of $7\times10^7$ Ω.cm, rubber hardness of 32° (JIS A), and surface roughness of 3 μm.Rz.

In Example 3, to form the surface layer 6, there were mixed and kneaded 100 parts by weight of epichlorohydrin rubber of binary copolymer (Epichloma C available from Daiso), 0.5 part by weight of stearic acid, 5 parts by weight of zinc flower, 1 part of vulcanization accelerator (Nocseler TT available from Ouchi Shinko Chemicals), 1.5 parts by weight of Nocseler DM also available from Ouchi Shinko Chemicals, and 0.25 part by weight of Sulfax H available from Tsurumi Chemicals, thereby preparing a compound having a uniform composition. 2.5 parts by weight of the compound were dissolved in a mixture of 48.8 parts by weight of toluen and 48.8 parts by weight of 4-methyl-2-pentanone. The resulting solution of epichlorohydrin rubber contained 2.5% of epichlorohydrin (paint A-2). 100 parts by weight of the paint A-2 and 40 parts by weight of paint B were mixed (ratio in solid: paint A-2/paint B=1.0/1.6). The mixture was coated on the elastic layer 5 by dipping and then dried at 160° C. for 30 minutes to form a 20 μm thick layer. The charge roller 2 with such a structure had properties shown in Example 3 of Table 1.

In Example 4, to form the elastic layer 5, the compound of Example 1 (ternary copolymer of epichlorohydrin/ethylene oxide/acrylgrycydil ether) and the compound of Example 3 (binary copolymer of epichlorohydrin/ethylene oxide) were mixed at a ratio of 1:1. Then, the procedure of Example 1 was repeated to fabricate a charge roller having a medium electric resistance, diameter of 12 mm, volume resistance of $1\times10^8$ Ω.cm, rubber hardness of 33° (JIS A), and surface roughness of 3 μm.Rz. To form the surface layer 6, 100 parts by weight of paint A-1 and 50 parts by weight of paint B were mixed (ratio in solid: paint A-1/paint B=½). The mixture paint was coated on the elastic layer 5 by dipping, and then dried at 160° C. for 30 minutes to form a 6 μm thick layer. The surface layer 6 had a volume resistance of $1\times10^{10}$ Ω.cm. The properties of the roller 2 are shown in Example 4 of Table 1.

In Example 5, only the paint B was coated on the elastic layer 5 of Example 1 by dipping and then dried at 100° C. for 30 minutes to form an 8 μm thick surface layer 6. The layer 6 had a volume resistivity of $2\times10^{14}$ Ω.cm. The properties of the resulting roller 2 are indicated in Example 5 of Table 1.

In Example 6, only the paint B was coated on the elastic layer 5 of Example 3 by dipping and then dried at 100° C. for 30 minutes to form a 5 μm thick surface layer. The properties of the resulting roller 2 are shown in Example 6 of Table 1.

In Table 1, Comparative Example (Comp. Ex.) 1 is representative of a case wherein a roller 2 had the elastic layer 5 of Example 1 and did not have the surface layer 6. It will be seen that when 5,000 copies are produced, irregular image density and toner filming occur.

Comparative Example 2 is identical with Example 1 except that the surface layer 6 was 230 μm thick. The roller 2 had a hardness of 48° (JIS A).

In Comparative Example 3, only the paint B was coated on the elastic layer 5 of Example 4 by dipping and then dried at 100° C. for 30 minutes to form a 30 μm thick surface layer 6. It will be seen that irregular image density and toner filming occur.

Comparative Example 4 is identical with Example 6 except that the surface layer 6 was 11 μm thick. In this example, charge potential and, therefore, image density is slightly lowered, as Table 1 indicates.

Comparative Example 5 is identical with Example 6 except that the surface layer 6 was 15 μm thick. In this case, charge potential and, therefore, image density is further lowered, as Table 1 also indicates.

In summary, it will be seen that the present invention provides a charge roller having various unprecedented advantages, as enumerated below.

(1) The roller is capable of charging a photoconductive element uniformly only if applied with a high-tension DC voltage. This eliminates the need for an AC voltage and produces no ozone. In addition, since the surface of the roller is not adhering, toner particles are prevented from depositing thereon over a long period of time.

(2) The toner particles are prevented from filming on the surface layer of the roller, while the photoconductive element is uniformly charged.

(3) Even when pin holes existing in the photoconductive element are brought into contact with the roller, breakdown due to current supply is eliminated.

(4) A non-adhering layer for eliminating the deposition of toner particles can be easily formed on the elastic layer.

Various modifications will become possible for those skilled in the art after receiving the teachings of the present disclosure without departing from the scope thereof.

What is claimed is:

1. A charge roller for charging a photoconductive element included in an image forming apparatus, comprising:
   - a metallic core;
   - a voltage source connected to the metallic core to apply a voltage to the metallic core;
   - an elastic layer made of a substance having a predetermined electric resistance and having no conductive particles dispersed therein formed around the metallic core; and
   - a surface layer made of a non-adhering substance being formed around the elastic layer, the surface layer being formed by a fluorine-containing resin soluble in a solvent;
   - wherein said substance having a predetermined electric resistance comprises epichlorohydrin rubber formed by a ternary copolymer of epichlorohydrin/ethylene oxide/arylglycidil ether.

2. The charge roller as claimed in claim 1, wherein said fluorine-containing resin of said surface layer is a fluorine-containing bridged copolymer produced by bridging the fluorine-containing resin with isocyanate, the fluorine-containing resin being comprised of a fluoroolefin and hydroxyl group-containing vinyl ether.

3. The charge roller as claimed in claim 1, wherein said fluorine-containing resin of said surface layer is a fluorine-containing bridged copolymer.

4. A charge roller for charging a photoconductive element included in an image forming apparatus, comprising:
   - a metallic core;
   - a voltage source connected to the metallic core to apply a voltage to the metallic core;
   - an elastic layer made of a substance having a predetermined electric resistance and having no conductive particles dispersed therein formed around the metallic core; and
   - a surface layer made of non-adhering substance being formed directly around the elastic layer to directly contact the elastic layer, the surface layer being formed by a fluorine-containing resin soluble in a solvent, the surface layer being 5 μm to 10 μm thick, wherein said substance having a predetermined electric resistance comprises epichlorohydrin rubber formed by a ternary copolymer of epichlorohydrin/ethylene oxide/arylglycidil ether.

5. A charge roller for charging a photoconductive element included in an image forming apparatus, comprising:
   - a metallic core;
   - a voltage source connected to the metallic core to apply a voltage to the metallic core;
   - an elastic layer made of a substance having a predetermined electric resistance and having no conductive particles dispersed therein formed around the metallic core; and
   - a surface layer made of non-adhering substance being formed directly around the elastic layer to directly contact the elastic layer, the surface layer being formed by a fluorine-containing resin soluble in a solvent, the surface layer being 5 μm to 10 μm thick, wherein said substance having a predetermined electric resistance comprises epichlorohydrin rubber formed of a binary copolymer of epichlorohydrin/ethylene oxide.

6. A charge roller for charging a photoconductive element included in an image forming apparatus, comprising:

a metallic core;

a voltage source connected to the metallic core to apply a voltage to the metallic core;

an elastic layer made of a substance having a predetermined electric resistance and having no conductive particles dispersed therein formed around the metallic core; and a surface layer made of non-adhering substance being formed directly around the elastic layer to directly contact the elastic layer, the surface layer being formed by a fluorine containing resin soluble in a solvent, the surface layer being 5 μm to 10 μm thick, wherein said substance having a predetermined electric resistance comprises epichlorohydrin rubber implemented by at least one of a ternary copolymer of epichlorohydrin/ethylene oxide/arylglycidil ether and a binary copolymer of epichlorohydrin/ethylene oxide.

* * * * *